(12) United States Patent
Liu et al.

(10) Patent No.: US 11,057,795 B2
(45) Date of Patent: Jul. 6, 2021

(54) TRANSMISSION RATE CONTROL METHOD AND APPARATUS

(71) Applicant: HUAWEI TECHNOLOGIES CO., LTD., Guangdong (CN)

(72) Inventors: Jing Liu, Shanghai (CN); Mingzeng Dai, Shanghai (CN); Wenjie Peng, Shanghai (CN); Yi Guo, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/693,897

(22) Filed: Nov. 25, 2019

(65) Prior Publication Data

US 2020/0092753 A1 Mar. 19, 2020

Related U.S. Application Data

(63) Continuation of application No. PCT/CN2018/091236, filed on Jun. 14, 2018.

(30) Foreign Application Priority Data

Jun. 16, 2017 (CN) .......................... 201710459105.7

(51) Int. Cl.
*H04W 28/12* (2009.01)
*H04W 76/15* (2018.01)
(Continued)

(52) U.S. Cl.
CPC ....... *H04W 28/12* (2013.01); *H04W 28/0257* (2013.01); *H04W 28/08* (2013.01); *H04W 76/15* (2018.02)

(58) Field of Classification Search
CPC ......... H04W 28/0933; H04W 28/0257; H04W 28/08; H04W 76/15; H04W 28/12;
(Continued)

(56) References Cited

U.S. PATENT DOCUMENTS

2014/0254476 A1 9/2014 Blankenship et al.
2015/0223178 A1* 8/2015 Pietraski ............. H04W 52/346
370/252

(Continued)

FOREIGN PATENT DOCUMENTS

CN 103052116 A 4/2013
EP 2753035 B1 11/2016

(Continued)

OTHER PUBLICATIONS

3GPP TS 23.401 V15.0.0 (Jun. 2017), "3rd Generation Partnership Project; Technical Specification Group Services and System Aspects; General Packet Radio Service (GPRS) enhancements for Evolved Universal Terrestrial Radio 4ccess Network (E-UTRAN) access (Release 15)," Jun. 2017, 386 pages.

(Continued)

*Primary Examiner* — Syed Ali
(74) *Attorney, Agent, or Firm* — Fish & Richardson P.C.

(57) ABSTRACT

Example transmission rate control methods and apparatus are described. One example method includes obtaining a user equipment aggregate maximum bit rate (UE-AMBR) by a master base station. The master base station determines, based on the UE-AMBR, a first UE-AMBR used for the master base station and a second UE-AMBR used for a secondary base station. The master base station sends the second UE-AMBR to the secondary base station, and sends instruction information used to instruct the secondary base station to control data splitting for the master base station to the secondary base station. In this application, a transmission rate between each base station and a UE is controlled by allocating a UE-AMBR.

13 Claims, 8 Drawing Sheets

(51) Int. Cl.
   *H04W 28/02* (2009.01)
   *H04W 28/08* (2009.01)
(58) Field of Classification Search
   CPC .. H04W 28/0867; H04W 28/22; H04L 5/001; H04L 5/0035
   See application file for complete search history.

(56) References Cited

U.S. PATENT DOCUMENTS

| | | | |
|---|---|---|---|
| 2017/0149546 A1* | 5/2017 | Zhang | H04L 5/0032 |
| 2018/0092118 A1* | 3/2018 | Kim | H04W 28/0278 |
| 2018/0278357 A1* | 9/2018 | Kim | H04J 11/0076 |
| 2020/0008255 A1* | 1/2020 | Sharma | H04W 12/041 |
| 2020/0044915 A1* | 2/2020 | Wang | H04W 76/18 |
| 2020/0045764 A1* | 2/2020 | Kim | H04W 76/27 |
| 2020/0154499 A1* | 5/2020 | Futaki | H04W 16/32 |

FOREIGN PATENT DOCUMENTS

| | | | |
|---|---|---|---|
| EP | 3603317 A1 | 2/2020 | |
| JP | 2017527237 A | 9/2017 | |
| WO | 2016021125 A1 | 2/2016 | |
| WO | 2016064215 A1 | 4/2016 | |

OTHER PUBLICATIONS

3GPP TS 33.401 V15.0.0 (Jun. 2017), "3rd Generation Partnership Project;Technical Specification Group Services and System Aspects; 3GPP System Architecture Evolution (SAE); Security architecture (Release 15)," Jun. 2017, 153 pages.
3GPP TS 36.300 V14.2.0 (Mar. 2017), "3rd Generation Partnership Project;Technical Specification Group Radio Access Network;Evolved Universal Terrestrial Radio Access (E-UTRA) and Evolved Universal Terrestrial Radio Access getwork (E-UTRAN); Overall description; Stage 2 (Release 14)," Mar. 2017, 330 pages.
3GPP TS 36.413 V14.2.0 (Mar. 2017), "3rd Generation Partnership Project;Technical Specification Group Radio Access Network; Evolved Universal Terrestrial Radio Access Network (E-UTRAN); S1 Application Protocol (S1AP) (Release 14)," Mar. 2017, 342 pages.
3GPP TS 36.423 V14.2.0 (Mar. 2017), "3rd Generation Partnership Project;Technical Specification Group Radio Access Network; Evolved Universal Terrestrial Radio Access Network (E-UTRAN); X2 application protocol (X2AP) (Release 14)," Mar. 2017, 242 pages.
3GPP TS 37.340 V0.1.1 (Jun. 2017), "3rd Generation Partnership Project; Technical Specification Group Radio Access Network; Evolved Universal Terrestrial Radio Access (E-UTRA) and NR; Multi-connectivity; Stage 2 (Release 15)," Jun. 2017, 30 pages.
3GPP TS 38.331 V0.0.3 (May 2017), "3rd Generation Partnership Project; Technical Specification Group Radio Access Network; NR; Radio Resource Control (RRC); Protocol specification (Release 15)," Mar. 2017, 20 pages.
3GPP TS 38-423 V0.1.0 (May 2017), "3rd Generation Partnership Project; Technical Specification Group Radio Access Network; NG Radio Access Network (NG-RAN); Xn application protocol (XnAP) (Release15)," May 2017, 53 pages.
Ericsson, "Open issues on UE-AMBR coordination," 3GPP TSG-RAN WG3 Meeting #87bis, R3-150750, Tenerife-Santa Cruz, Apr. 20-24, 2015, 3 pages.
Extended European Search Report issued in European Application No. 18816478.4 dated Mar. 27, 2020, 10 pages.
Huawei, "AMBR Coordination between MeNB and SeNB," 3GPP TSG RAN WG3 Meeting #83bis, R3-140563, San Jose del Cabo, Mexico, Mar. 31-Apr. 4, 2014, 3 pages.
Huawei, "UE-AMBR enforcement in EN-DC," 3GPP TSG-RAN WG3 #97, R3-173180, Berlin, Germany, Aug. 21-25, 2017, 4 pages.
Huawei, "UE-AMBR enforcement in EN-DC," 3GPP TSG-RAN WG3 #NR2 Ad-Hoc, R3-172465, Qingdao, China, Jun. 27-29, 2017, 4 pages.
Huawei, HiSilicon, "UE-AMBR enforcement in EN-DC," 3GPP TSG-RAN WG2 NR Adhoc#2, R2-1707421, Qingdao, China, Jun. 27-29, 2017, 4 pages.
Huawei, HiSilicon, "UE-AMBR enforcement in EN-DC," 3GPP TSG-RAN WG2 Meeting #99, R2-1709435, Berlin, Germany, Aug. 21-25, 2017, 4 pages.
PCT International Search Report and Written Opinion issued in International Application No. PCT/CN2018/091236 dated Aug. 22, 2018, 20 pages (with English translation).
Nsn et al., "MeNB-initiated procedures for dual connectivity," 3GPP TSG-RAN WG2 Meeting #86, R2-142307, Seoul, Korea, May 19-23, 2014, 12 pages.
3GPP TS 37.340 V0.1.1 (Jun. 2017), "3rd Generation Partnership Project; Technical Specification Group Radio Access Network; Evolved Universal Terrestrial Radio Access (E-UTRA) and NR; Multi-connectivity; Stage 2 (Release 15)," Jun. 13, 2017, 32 pages.
Ericsson, "Addition, modification, and release of DRBs in EN-DC," 3GPP TSG RAN WG2 #98, R2-1704420, Hangzhou, PR of China, May 15-19, 2017, 3 pages.
Nokia Networks, "Way forward of UE-AMBR open issues," 3GPP TSG-RAN WG3#85, R3-141674, Dresden, Germany, Aug. 18-22, 2014, 6 pages.
Office Action issued in Japanese Application No. 2020-518119 dated Feb. 16, 2021, 13 pages (with English translation).
Office Action issued in Korean Application No. 2019-7036215 dated Jan. 11, 2021, 8 pages (with English translation).

* cited by examiner

TRANSMISSION RATE CONTROL METHOD AND APPARATUS

CROSS-REFERENCE TO RELATED APPLICATIONS

This application is a continuation of International Application No. PCT/CN2018/091236, filed on Jun. 14, 2018, which claims priority to Chinese Patent Application No. 201710459105.7, filed on Jun. 16, 2017. The disclosures of the aforementioned applications are hereby incorporated by reference in their entireties.

TECHNICAL FIELD

This application relates to the field of communications technologies, and in particular, to a transmission rate control method and an apparatus.

BACKGROUND

In a dual connectivity (DC) system, one user equipment (UE) is usually connected to two base stations, to increase a bandwidth and a throughput.

In the DC system, because there are two base stations serving the UE on a network side, a user equipment aggregate maximum bit rate (UE-AMBR) is divided into two parts that are separately used to restrict a sum of rates of all non-guaranteed bit rate (non-GBR) services, of the UE, transmitted on each base station, to be specific, a sum of rates of all non-GBR services cannot exceed a value of the UE-AMBR.

Therefore, in the DC system, how to allocate the UE-AMBR to control a transmission rate between each base station and the UE is a technical problem to be urgently resolved.

SUMMARY

This application provides a transmission rate control method and an apparatus, to control a transmission rate between each base station and a UE by allocating a UE-AMBR in a DC system.

A first aspect of this application provides a transmission rate control method, including:

obtaining, by a master base station, a UE-AMBR;

determining, by the master base station based on the UE-AMBR, a first UE-AMBR used for the master base station and a second UE-AMBR used for a secondary base station;

sending, by the master base station, the second UE-AMBR to the secondary base station; and sending, by the master base station to the secondary base station, instruction information used to instruct the secondary base station to control data splitting for the master base station.

A sum of the first UE-AMBR and the second UE-AMBR may be equal to the UE-AMBR, or may be less than the UE-AMBR. In addition, the first UE-AMBR may further include an uplink first UE-AMBR and a downlink first UE-AMBR. Likewise, the second UE-AMBR further includes an uplink second UE-AMBR and a downlink second UE-AMBR.

In the transmission rate control method provided in the first aspect of this application, after determining the second UE-AMBR, the master base station sends the second UE-AMBR to the secondary base station, and after obtaining the second UE-AMBR, the secondary base station controls a transmission rate between the secondary base station and a UE based on the second UE-AMBR, to ensure that a sum of rates of all non-GBR services of the UE on the secondary base station does not exceed a limit of the second UE-AMBR. In addition, when a split bearer anchored on the secondary base station (SCG split bearer) exists on the master base station, the master base station further sends the instruction information to the secondary base station, and the secondary base station controls, based on the received instruction information, a rate of sending split data to the master base station.

Optionally, when only a split bearer anchored on the secondary base station (SCG split bearer) exists on the master base station, the instruction information is a third UE-AMBR, and the third UE-AMBR is equal to the first UE-AMBR.

In this solution, the third UE-AMBR includes an uplink third UE-AMBR (equal to the uplink first UE-AMBR) and a downlink third UE-AMBR (equal to the downlink first UE-AMBR), and the secondary base station controls, based on the received downlink third UE-AMBR, a downlink transmission rate of performing data splitting for the master base station, to control a downlink transmission rate between the master base station and the UE.

Optionally, when only a split bearer anchored on the secondary base station (SCG split bearer) exists on the master base station, the instruction information is splitting control information.

In this solution, the splitting control information includes data buffer-related information of the master base station and/or data sending-related information of the master base station, or a data transmission rate of the master base station, or the like. In addition, the secondary base station controls, based on the received splitting control information, a downlink transmission rate of performing data splitting for the master base station, to control a downlink transmission rate between the master base station and the UE.

Optionally, when both a split bearer anchored on the secondary base station (SCG split bearer) and a master cell group bearer (MCG bearer) exist on the master base station, the instruction information is a fourth UE-AMBR, and the fourth UE-AMBR is less than the first UE-AMBR.

In this solution, data on the master base station includes two parts: data split from the secondary base station and data individually borne on the master base station. In this case, the master base station needs to control a sum of transmission rates of the two parts of data not to be greater than the first UE-AMBR. Therefore, the instruction information that is sent by the master base station to the secondary base station is the fourth UE-AMBR, and the fourth UE-AMBR is less than the first UE-AMBR. In this case, the secondary base station controls, based on the received fourth UE-AMBR, a downlink transmission rate of performing data splitting for the master base station, so that the downlink transmission rate is not greater than the fourth UE-AMBR.

Optionally, when both a split bearer anchored on the secondary base station (SCG split bearer) and a master cell group bearer (MCG bearer) exist on the master base station, the instruction information is splitting control information.

In this solution, the splitting control information includes data buffer-related information of the master base station and/or data sending-related information of the master base station, or a data transmission rate of the master base station, or the like. In addition, data on the master base station includes two parts: data split from the secondary base station and data individually borne on the master base station. In this case, the master base station needs to control a sum of transmission rates of the two parts of data not to be greater than the first UE-AMBR. After receiving the splitting control information sent by the master base station, the secondary base station controls, based on the received splitting control information, a downlink transmission rate of performing data splitting for the master base station.

Optionally, the method further includes:

receiving, by the master base station, an adjusted second UE-AMBR from the secondary base station;

adjusting, by the master base station, the first UE-AMBR based on the adjusted second UE-AMBR; and controlling, by the master base station, a transmission rate between the master base station and user equipment UE based on an adjusted first UE-AMBR.

In this solution, after receiving the second UE-AMBR sent by the master base station, the secondary base station may determine, based on network resource status information of the secondary base station, whether the received second UE-AMBR needs to be adjusted, and if the received second UE-AMBR needs to be adjusted, adjust the second UE-AMBR, and send the adjusted second UE-AMBR to the master base station. The master base station controls the transmission rate between the master base station and the user equipment UE based on the adjusted first UE-AMBR. The network resource status information may include, for example, air interface signal quality and/or a load status, or other information.

Optionally, the method further includes:

when the master base station is configured to transmit uplink split data, controlling, by the master base station, an uplink transmission rate between the master base station and the UE based on the first UE-AMBR, where this step includes:

controlling, by the master base station, an uplink transmission rate that is of the split bearer anchored on the secondary base station and that is between the master base station and the UE.

In this solution, when only the split bearer anchored on the secondary base station (SCG split bearer) exists on the master base station, when the master base station is configured to transmit the uplink split data, the master base station controls the uplink transmission rate between the master base station and the UE based on the uplink third UE-AMBR. Specifically, because only the split bearer anchored on the secondary base station (SCG split bearer) exists on the master base station, the master base station controls the uplink transmission rate that is of the split bearer anchored on the secondary base station and that is between the master base station and the UE.

Optionally, the method further includes:

when the master base station is configured to transmit uplink split data, controlling, by the master base station, an uplink transmission rate between the master base station and the UE based on the first UE-AMBR, where this step includes:

controlling, by the master base station, uplink transmission rates that are of the master cell group bearer and the split bearer anchored on the secondary base station and that are between the master base station and the UE.

In this solution, when both the split bearer anchored on the secondary base station (SCG split bearer) and the master cell group bearer (MCG bearer) exist on the master base station, when the master base station is configured to transmit the uplink split data, the master base station controls the uplink transmission rate between the master base station and the UE based on the first UE-AMBR. Specifically, the master base station controls the uplink transmission rates that are of the master cell group bearer and the split bearer anchored on the secondary base station and that are between the master base station and the UE based on the uplink first UE-AMBR.

Optionally, the method further includes:

controlling, by the master base station, a downlink transmission rate between the master base station and the UE based on the first UE-AMBR, where this step includes:

controlling, by the master base station, a downlink transmission rate that is of the split bearer anchored on the secondary base station and that is between the master base station and the UE.

In this solution, when only the split bearer anchored on the secondary base station (SCG split bearer) exists on the master base station, and the instruction information is the splitting control information, the secondary base station controls, based only on the splitting control information, the downlink transmission rate of performing data splitting for the master base station. Therefore, after the secondary base station performs data splitting for the master base station, the master base station controls the downlink transmission rate between the master base station and the UE based on the first UE-AMBR. Specifically, the master base station controls the downlink transmission rate that is of the split bearer anchored on the secondary base station and that is between the master base station and the UE based on the downlink first UE-AMBR.

Optionally, the method further includes:

controlling, by the master base station, a downlink transmission rate between the master base station and the UE based on the first UE-AMBR, where this step includes:

controlling downlink transmission rates that are of the master cell group bearer and the split bearer anchored on the secondary base station and that are between the master base station and the UE.

In this solution, when both the split bearer anchored on the secondary base station (SCG split bearer) and the master cell group bearer (MCG bearer) exist on the master base station, because both the split bearer anchored on the secondary base station (SCG split bearer) and the master cell group bearer (MCG bearer) exist on the master base station, after the secondary base station performs data splitting for the master base station, the master base station controls the downlink transmission rate between the master base station and the UE based on the first UE-AMBR. Specifically, the master base station controls the downlink transmission rates that are of the master cell group bearer and the split bearer anchored on the secondary base station and that are between the master base station and the UE based on the downlink first UE-AMBR.

A second aspect of this application provides a transmission rate control method, including:

receiving, by a secondary base station from a master base station, a second user equipment aggregate maximum bit rate UE-AMBR used for the secondary base station, where the second UE-AMBR is obtained based on a UE-AMBR; and receiving, by the secondary base station, instruction information from the master base station, where the instruction information is used to instruct the secondary base station to control data splitting for the master base station.

In the transmission rate control method provided in the second aspect of this application, after determining the second UE-AMBR, the master base station sends the second UE-AMBR to the secondary base station, and after obtaining the second UE-AMBR, the secondary base station controls a transmission rate between the secondary base station and a UE based on the second UE-AMBR, to ensure that a sum of rates of all non-GBR services of the UE on the secondary base station does not exceed a limit of the second UE-AMBR. In addition, when a split bearer anchored on the secondary base station (SCG split bearer) exists on the master base station, the master base station further sends the instruction information to the secondary base station, and the secondary base station controls, based on the received instruction information, a rate of sending split data to the master base station.

Optionally, when only a split bearer anchored on the secondary base station (SCG split bearer) exists on the master base station, the instruction information is a third UE-AMBR, the third UE-AMBR is equal to a first UE-AMBR used for the master base station, and the first UE-AMBR is obtained based on the UE-AMBR, and the method further includes:

controlling, by the secondary base station, a downlink transmission rate between the master base station and user equipment based on the third UE-AMBR, where this step includes:

controlling, by the secondary base station, a downlink transmission rate that is of the split bearer anchored on the secondary base station and that is between the master base station and the UE.

In this solution, the third UE-AMBR includes an uplink third UE-AMBR (equal to an uplink first UE-AMBR) and a downlink third UE-AMBR (equal to a downlink first UE-AMBR), and the secondary base station controls, based on the received downlink third UE-AMBR, a downlink transmission rate of performing data splitting for the master base station, to control the downlink transmission rate between the master base station and the UE.

Optionally, when only a split bearer anchored on the secondary base station (SCG split bearer) exists on the master base station, the instruction information is splitting control information, and the method further includes:

sending, by the secondary base station, split data to the master base station according to the splitting control information.

In this solution, the splitting control information includes data buffer-related information of the master base station and/or data sending-related information of the master base station, or a data transmission rate of the master base station, or the like. In addition, the secondary base station controls, based on the received splitting control information, a downlink transmission rate of performing data splitting for the master base station, to control a downlink transmission rate between the master base station and UE.

Optionally, when both a split bearer anchored on the secondary base station (SCG split bearer) and a master cell group bearer (MCG bearer) exist on the master base station, the instruction information is a fourth UE-AMBR, the fourth UE-AMBR is less than a first UE-AMBR used for the master base station, and the first UE-AMBR is obtained based on the UE-AMBR, and the method further includes:

sending, by the secondary base station, split data to the master base station according to the fourth UE-AMBR.

In this solution, data on the master base station includes two parts: data split from the secondary base station and data individually borne on the master base station. In this case, the master base station needs to control a sum of transmission rates of the two parts of data not to be greater than the first UE-AMBR. Therefore, the instruction information that is sent by the master base station to the secondary base station is the fourth UE-AMBR, and the fourth UE-AMBR is less than the first UE-AMBR. In this case, the secondary base station controls, based on the received fourth UE-AMBR, a downlink transmission rate of performing data splitting for the master base station, so that the downlink transmission rate is not greater than the fourth UE-AMBR.

Optionally, when both a split bearer anchored on the secondary base station (SCG split bearer) and a master cell group bearer (MCG bearer) exist on the master base station, the instruction information is splitting control information, and the method further includes:

sending, by the secondary base station, split data to the master base station according to the splitting control information.

In this solution, the splitting control information includes data buffer-related information of the master base station and/or data sending-related information of the master base station, or a data transmission rate of the master base station, or the like. In addition, data on the master base station includes two parts: data split from the secondary base station and data individually borne on the master base station. In this case, the master base station needs to control a sum of transmission rates of the two parts of data not to be greater than a first UE-AMBR. After receiving the splitting control information sent by the master base station, the secondary base station controls, based on the received splitting control information, a downlink transmission rate of performing data splitting for the master base station.

Optionally, the method further includes:

adjusting, by the secondary base station, the second UE-AMBR, and sending an adjusted second UE-AMBR to the master base station.

In this solution, after receiving the second UE-AMBR sent by the master base station, the secondary base station may determine, based on network resource status information of the secondary base station, whether the received second UE-AMBR needs to be adjusted, and if the received second UE-AMBR needs to be adjusted, adjust the second UE-AMBR, and send the adjusted second UE-AMBR to the master base station. The master base station controls a transmission rate between the master base station and the user equipment UE based on an adjusted first UE-AMBR. The network resource status information may include, for example, air interface signal quality and/or a load status, or other information.

A third aspect of this application provides a transmission rate control method, including:

receiving, by a secondary base station from a master base station, a user equipment aggregate maximum bit rate UE-AMBR;

determining, by the secondary base station based on the UE-AMBR, a first UE-AMBR used for the master base station and a second UE-AMBR used for the secondary base station; and sending, by the secondary base station, the first UE-AMBR and/or the second UE-AMBR to the master base station.

The first UE-AMBR includes an uplink first UE-AMBR and a downlink first UE-AMBR, and the second UE-AMBR further includes an uplink second UE-AMBR and a downlink second UE-AMBR.

After determining the first UE-AMBR and the second UE-AMBR, the secondary base station may send only the first UE-AMBR to the master base station. Alternatively, the secondary base station may send only the second UE-AMBR to the master base station. In this case, the master base station calculates the first UE-AMBR based on the UE-AMBR and the second UE-AMBR, for example, may calculate the first UE-AMBR by subtracting the second UE-AMBR from the UE-AMBR. Alternatively, the secondary base station may send both the first UE-AMBR and the second UE-AMBR to the master base station.

In the transmission rate control method provided in the third aspect of this application, the secondary base station receives the UE-AMBR from the master base station, determines, based on the UE-AMBR, the first UE-AMBR used for the master base station and the second UE-AMBR used for the secondary base station, and sends the first UE-AMBR and/or the second UE-AMBR to the master base station, so that the master base station obtains the first UE-AMBR, and controls a transmission rate between the master base station and a UE based on the first UE-AMBR, to ensure that a sum of rates of all non-GBR services of the UE on the master base station does not exceed a limit of the first UE-AMBR. In addition, the secondary base station controls a transmission rate between the secondary base station and the UE based on the second UE-AMBR, to ensure that a sum of rates of all non-GBR services of the UE on the secondary base station does not exceed a limit of the second UE-AMBR.

Optionally, the method further includes:

receiving, by the secondary base station, reference information sent by the master base station, where the reference information includes:

information about all non-guaranteed bit rate non-GBR services supported by user equipment UE; or information about a non-GBR service corresponding to a master cell group bearer; and the determining, by the secondary base station based on the UE-AMBR, a first UE-AMBR used for the secondary base station and a second UE-AMBR used for the master base station includes:

determining, by the secondary base station, the first UE-AMBR and the second UE-AMBR based on the reference information and the UE-AMBR.

Optionally, the information about the non-GBR service includes at least one of the following combinations:

a quantity of non-GBR services; or a quality of service class identifier QCI corresponding to the non-GBR service; or a radio access bearer identifier corresponding to the non-GBR service; or an allocation/retention priority (ARP) corresponding to the non-GBR service.

In this solution, in the reference information, all the non-GBR services of the UE are all non-GBR services individually borne on the master base station, and the QCI corresponding to the non-GBR service borne on the master base station is a QCI corresponding to the non-GBR service individually borne on the master base station. The master base station sends the reference information to the secondary base station, and the secondary base station may learn of, based on the reference information, information related to the non-GBR service individually borne on the master base station. In this case, the secondary base station determines the first UE-AMBR and the second UE-AMBR based on the reference information and the UE-AMBR.

A fourth aspect of this application provides a transmission rate control method, including:

sending, by a master base station, a user equipment aggregate maximum bit rate UE-AMBR to a secondary base station; and receiving, by the master base station, a first UE-AMBR and/or a second UE-AMBR from the secondary base station, where the first UE-AMBR and the second UE-AMBR are obtained based on the UE-AMBR.

The first UE-AMBR includes an uplink first UE-AMBR and a downlink first UE-AMBR, and the second UE-AMBR further includes an uplink second UE-AMBR and a downlink second UE-AMBR.

After determining the first UE-AMBR and the second UE-AMBR, the secondary base station may send only the first UE-AMBR to the master base station. Alternatively, the secondary base station may send only the second UE-AMBR to the master base station. In this case, the master base station calculates the first UE-AMBR based on the UE-AMBR and the second UE-AMBR, for example, may calculate the first UE-AMBR by subtracting the second UE-AMBR from the UE-AMBR Alternatively, the secondary base station may send both the first UE-AMBR and the second UE-AMBR to the master base station.

In the transmission rate control method provided in the fourth aspect of this application, the secondary base station receives the UE-AMBR from the master base station, determines, based on the UE-AMBR, the first UE-AMBR used for the master base station and the second UE-AMBR used for the secondary base station, and sends the first UE-AMBR and/or the second UE-AMBR to the master base station, so that the master base station obtains the first UE-AMBR, and controls a transmission rate between the master base station and a UE based on the first UE-AMBR, to ensure that a sum of rates of all non-GBR services of the UE on the master base station does not exceed a limit of the first UE-AMBR. In addition, the secondary base station controls a transmission rate between the secondary base station and the UE based on the second UE-AMBR, to ensure that a sum of rates of all non-GBR services of the UE on the secondary base station does not exceed a limit of the second UE-AMBR.

Optionally, the method further includes:

sending, by the master base station, reference information to the secondary base station, where the reference information includes:

information about all non-guaranteed bit rate non-GBR services supported by user equipment UE; or information about a non-GBR service corresponding to a master cell group bearer.

Optionally, the information about the non-GBR service includes at least one of the following combinations:

a quantity of non-GBR services; or a quality of service class identifier QCI corresponding to the non-GBR service; or a radio access bearer identifier corresponding to the non-GBR service; or an allocation/retention priority ARP corresponding to the non-GBR service.

In this solution, in the reference information, all the non-GBR services of the UE are all non-GBR services individually borne on the master base station, and the QCI corresponding to the non-GBR service borne on the master base station is a QCI corresponding to the non-GBR service individually borne on the master base station. The master base station sends the reference information to the secondary base station, and the secondary base station may learn of, based on the reference information, information related to the non-GBR service individually borne on the master base station. In this case, the secondary base station determines the first UE-AMBR and the second UE-AMBR based on the reference information and the UE-AMBR.

A fifth aspect of this application provides a transmission rate control method, including:

obtaining, by a master base station, a user equipment aggregate maximum bit rate UE-AMBR;

determining, by the master base station, a bearer type of a secondary base station, and determining, based on the UE-AMBR, a second UE-AMBR used for the secondary base station, where the second UE-AMBR is used by the secondary base station to control a terminal transmission rate based on the bearer type of the secondary base station; and sending, by the master base station, the second UE-AMBR and the bearer type of the secondary base station to the secondary base station.

In the transmission rate control method provided in the fifth aspect of this application, the master base station obtains the UE-AMBR, determines the bearer type of the secondary base station, and determines, based on the UE-AMBR and the bearer type, a first UE-AMBR used for the master base station and the second UE-AMBR used for the secondary base station, and the master base station may send the second UE-AMBR and the bearer type to the secondary base station, and the secondary base station controls the UE transmission rate based on the bearer type.

Specifically, when the bearer type of the secondary base station includes only a secondary cell group bearer (SCG bearer), that the second UE-AMBR is used by the secondary base station to control a terminal transmission rate based on the bearer type of the secondary base station includes:

the secondary base station controls a transmission rate between the secondary base station and UE based on the second UE-AMBR.

Optionally, when the bearer type of the secondary base station includes only a split bearer anchored on the secondary base station (SCG split bearer), that the second UE-AMBR is used by the secondary base station to control a terminal transmission rate based on the bearer type of the secondary base station includes:

over a downlink, based on the second UE-AMBR, the secondary base station controls a downlink transmission rate that is of the split bearer anchored on the secondary base station and that is between the secondary base station and the UE, and controls a downlink transmission rate that is of the split bearer anchored on the secondary base station and that is between the master base station and the UE; or over an uplink, when the secondary base station is configured to transmit uplink split data, the secondary base station controls an uplink transmission rate that is of the split bearer anchored on the secondary base station and that is between the secondary base station and the UE based on the second UE-AMBR.

Optionally, when the bearer type of the secondary base station includes a secondary cell group bearer (SCG bearer) and a split bearer anchored on the secondary base station (SCG split bearer), that the second UE-AMBR is used by the secondary base station to control a terminal transmission rate based on the bearer type of the secondary base station includes:

over a downlink, based on the second UE-AMBR, the secondary base station controls downlink transmission rates that are of the secondary cell group bearer and the split bearer anchored on the secondary base station and that are between the secondary base station and a UE, and controls a downlink transmission rate that is of the split bearer anchored on the secondary base station and that is between the master base station and the UE; or over an uplink, when the secondary base station is configured to transmit uplink split data, the secondary base station controls uplink transmission rates that are of the secondary cell group bearer and the split bearer anchored on the secondary base station and that are between the secondary base station and the UE based on the second UE-AMBR.

A sixth aspect of embodiments of this application provides a communications apparatus. The apparatus includes units or means configured to perform the method provided in any one of the first aspect or the implementations of the first aspect.

A seventh aspect of embodiments of this application provides a communications apparatus. The apparatus includes units or means configured to perform the method provided in any one of the second aspect or the implementations of the second aspect.

An eighth aspect of embodiments of this application provides a communications apparatus. The apparatus includes units or means configured to perform the method provided in any one of the third aspect or the implementations of the third aspect.

A ninth aspect of embodiments of this application provides a communications apparatus. The apparatus includes units or means configured to perform the method provided in any one of the fourth aspect or the implementations of the fourth aspect.

A tenth aspect of embodiments of this application provides a communications apparatus. The apparatus includes units or means configured to perform the method provided in any one of the fifth aspect or the implementations of the fifth aspect.

An eleventh aspect of embodiments of this application provides a communications apparatus. The apparatus includes a processor and a memory, the memory is configured to store a program, and the processor invokes the program stored in the memory, to perform the method provided in the first aspect of this application. The communications apparatus may be a base station chip.

A twelfth aspect of embodiments of this application provides a communications apparatus. The apparatus includes a processor and a memory, the memory is configured to store a program, and the processor invokes the program stored in the memory, to perform the method provided in the second aspect of this application. The communications apparatus may be a base station chip.

A thirteenth aspect of embodiments of this application provides a communications apparatus. The apparatus includes a processor and a memory, the memory is configured to store a program, and the processor invokes the program stored in the memory, to perform the method provided in the third aspect of this application. The communications apparatus may be a base station chip.

A fourteenth aspect of embodiments of this application provides a communications apparatus. The apparatus includes a processor and a memory, the memory is configured to store a program, and the processor invokes the program stored in the memory, to perform the method provided in the fourth aspect of this application. The communications apparatus may be a base station chip.

A fifteenth aspect of embodiments of this application provides a communications apparatus. The apparatus includes a processor and a memory, the memory is configured to store a program, and the processor invokes the program stored in the memory, to perform the method provided in the fifth aspect of this application. The communications apparatus may be a base station chip.

A sixteenth aspect of embodiments of this application provides a base station, including at least one processing element (or chip) configured to perform the method in the first aspect. The base station may serve as a master base station of a terminal.

A seventeenth aspect of embodiments of this application provides a base station, including at least one processing element (or chip) configured to perform the method in the second aspect. The base station may serve as a secondary base station of a terminal.

An eighteenth aspect of embodiments of this application provides a base station, including at least one processing element (or chip) configured to perform the method in the third aspect. The base station may serve as a secondary base station of a terminal.

A nineteenth aspect of embodiments of this application provides a base station, including at least one processing element (or chip) configured to perform the method in the fourth aspect. The base station may serve as a master base station of a terminal.

A twentieth aspect of embodiments of this application provides a base station, including at least one processing element (or chip) configured to perform the method in the fifth aspect. The base station may serve as a master base station of a terminal.

A twenty-first aspect of embodiments of this application provides a transmission rate control program, and when being executed by a processor, the program is used to perform the method in the first aspect.

A twenty-second aspect of embodiments of this application provides a program product, for example, a computer readable storage medium, including the program in the twenty-first aspect.

A twenty-third aspect of embodiments of this application provides a transmission rate control program, and when being executed by a processor, the program is used to perform the method in the second aspect.

A twenty-fourth aspect of embodiments of this application provides a program product, for example, a computer readable storage medium, including the program in the twenty-third aspect.

A twenty-fifth aspect of embodiments of this application provides a transmission rate control program, and when being executed by a processor, the program is used to perform the method in the third aspect.

A twenty-sixth aspect of embodiments of this application provides a program product, for example, a computer readable storage medium, including the program in the twenty-fifth aspect.

A twenty-seventh aspect of embodiments of this application provides a transmission rate control program, and when being executed by a processor, the program is used to perform the method in the fourth aspect.

A twenty-eighth aspect of embodiments of this application provides a program product, for example, a computer readable storage medium, including the program in the twenty-seventh aspect.

A twenty-ninth aspect of embodiments of this application provides a transmission rate control program, and when being executed by a processor, the program is used to perform the method in the fifth aspect.

A thirtieth aspect of embodiments of this application provides a program product, for example, a computer readable storage medium, including the program in the twenty-ninth aspect.

In the foregoing first aspect, after determining the second UE-AMBR, the master base station sends the second UE-AMBR to the secondary base station, and after obtaining the second UE-AMBR, the secondary base station controls the transmission rate between the secondary base station and the UE based on the second UE-AMBR, to ensure that the sum of the rates of all the non-GBR services of the UE on the secondary base station does not exceed the limit of the second UE-AMBR. In addition, when the split bearer anchored on the secondary base station (SCG split bearer) exists on the master base station, the master base station further sends the instruction information to the secondary base station, and the secondary base station controls, based on the received instruction information, the rate of sending the split data to the master base station.

In the foregoing second aspect, after determining the second UE-AMBR, the master base station sends the second UE-AMBR to the secondary base station, and after obtaining the second UE-AMBR, the secondary base station controls the transmission rate between the secondary base station and the UE based on the second UE-AMBR, to ensure that the sum of the rates of all the non-GBR services of the UE on the secondary base station does not exceed the limit of the second UE-AMBR. In addition, when the split bearer anchored on the secondary base station (SCG split bearer) exists on the master base station, the master base station further sends the instruction information to the secondary base station, and the secondary base station controls, based on the received instruction information, the rate of sending the split data to the master base station.

In the foregoing third aspect, the secondary base station receives the UE-AMBR from the master base station, determines, based on the UE-AMBR, the first UE-AMBR used for the master base station and the second UE-AMBR used for the secondary base station, and sends the first UE-AMBR and/or the second UE-AMBR to the master base station, so that the master base station obtains the first UE-AMBR, and controls the transmission rate between the master base station and the UE based on the first UE-AMBR, to ensure that the sum of the rates of all the non-GBR services of the UE on the master base station does not exceed the limit of the first UE-AMBR. In addition, the secondary base station controls the transmission rate between the secondary base station and the UE based on the second UE-AMBR, to ensure that the sum of the rates of all the non-GBR services of the UE on the secondary base station does not exceed the limit of the second UE-AMBR.

In the foregoing fourth aspect, the secondary base station receives the UE-AMBR from the master base station, determines, based on the UE-AMBR, the first UE-AMBR used for the master base station and the second UE-AMBR used for the secondary base station, and sends the first UE-AMBR and/or the second UE-AMBR to the master base station, so that the master base station obtains the first UE-AMBR, and controls the transmission rate between the master base station and the UE based on the first UE-AMBR, to ensure that the sum of the rates of all the non-GBR services of the UE on the master base station does not exceed the limit of the first UE-AMBR. In addition, the secondary base station controls the transmission rate between the secondary base station and the UE based on the second UE-AMBR, to ensure that the sum of the rates of all the non-GBR services of the UE on the secondary base station does not exceed the limit of the second UE-AMBR.

In the foregoing fifth aspect, the master base station obtains the UE-AMBR, determines the bearer type of the secondary base station, and determines, based on the UE-AMBR and the bearer type, the first UE-AMBR used for the master base station and the second UE-AMBR used for the secondary base station, and the master base station may send the second UE-AMBR and the bearer type to the secondary base station. The secondary base station may control the transmission rate between the secondary base station and the UE based on the second UE-AMBR and the bearer type, and the master base station controls the transmission rate between the master base station and the UE based on the first UE-AMBR.

DESCRIPTION OF EMBODIMENTS

In the following, some terms in this application are described, to help a person skilled in the art have a better understanding.

(1). UE may also be referred to as a mobile terminal, mobile user equipment, or the like, and may communicate with one or more core networks through a radio access network (for example, RAN, radio access network). The user equipment may be a mobile terminal such as a mobile phone (also referred to as a "cellular" phone) or a computer with a mobile terminal. For example, the user equipment may be a portable mobile apparatus, a pocket-sized mobile apparatus, a handheld mobile apparatus, a computer built-in mobile apparatus, or an in-vehicle mobile apparatus that exchanges voice and/or data with the radio access network.

(2). A base station may be a base transceiver station (BTS) in GSM (Global System for Mobile Communications) or CDMA (Code Division Multiple Access), may be a NodeB in WCDMA (Wideband Code Division Multiple Access), may be an evolved NodeB (eNodeB, eNB, or e-NodeB) in LTE (Long-Term Evolution), may be a transmission/reception point (TRP for short), a gNB, a TP (transmission point), a centralized unit (CU for short), or a distributed unit (DU for short) in NR, or may be a node in a 5th generation (5G) network, or the like. This is not limited in this application.

(3). A unit in this application is a functional unit or a logical unit. The unit may be in a form of software, and a function of the unit is implemented by a processor executing program code. Alternatively, the unit may be in a form of hardware.

(4). "A plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" generally indicates an "or" relationship between associated objects. A range described by using "above", "below", or the like includes boundary points.

Figure 1:
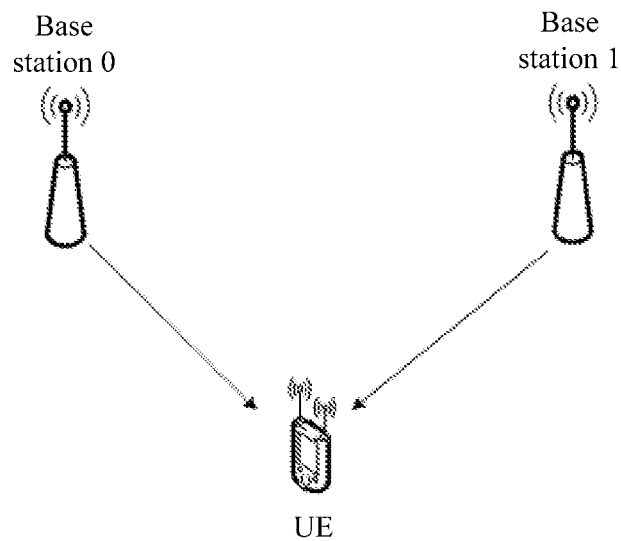
FIG. 1 is an architectural diagram of a DC system.

A transmission rate control method provided in the embodiments of this application may be applied to a DC system scenario. FIG. 1 is an architectural diagram of a DC system. As shown in FIG. 1, the system includes two base stations: a base station 0 and a base station 1. The base station 0 may serve as a master base station of UE, and the base station 1 may serve as a secondary base station of the UE. Alternatively, the base station 0 may serve as a secondary base station of UE, and the base station 1 may serve as a master base station of the UE. This is not limited in this application. In the DC system, both the base station 0 and the base station 1 serve the UE.

In the embodiments of this application, an example in which the master base station is an LTE base station and the secondary base station is an NR base station is used for description. Certainly, in actual application, the master base station may be an NR base station, and the secondary base station is an LTE base station. Alternatively, both the master base station and the secondary base station are NR base stations or the like. This is not particularly limited in the embodiments of this application.

Figure 2A:
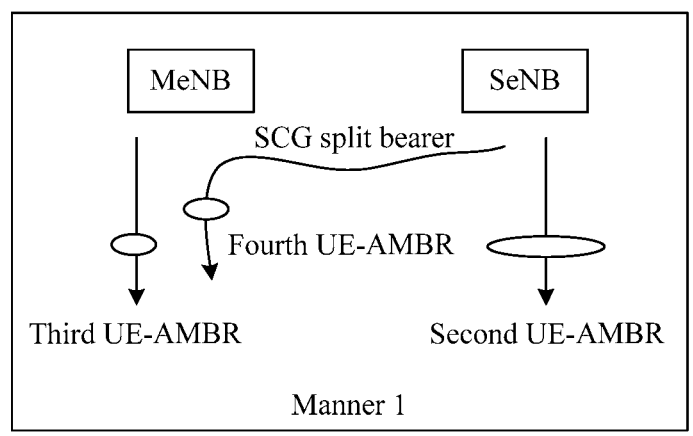
FIG. 2*a* is a schematic diagram of a dedicated radio bearer (DRB) according to an embodiment of this application.
Figure 2B:
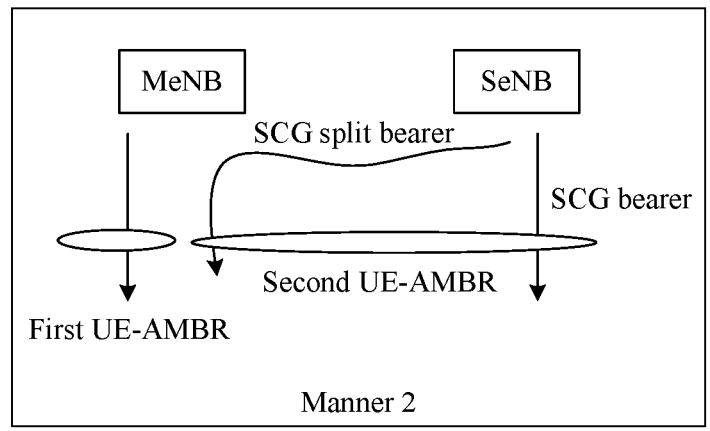
FIG. 2*b* is another schematic diagram of a DRB according to an embodiment of this application.
Figure 2C:
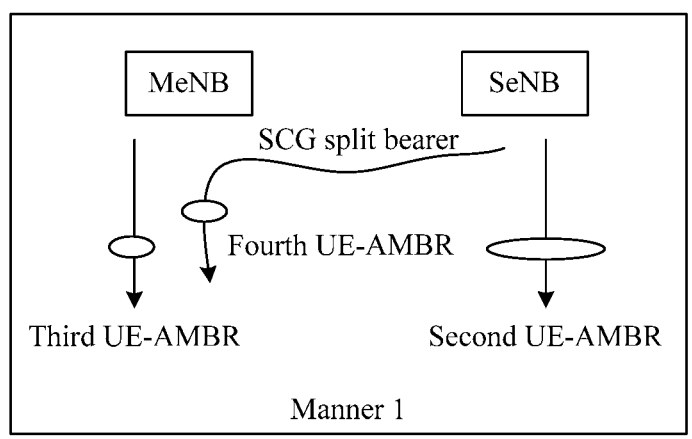
FIG. 2*c* is still another schematic diagram of a DRB according to an embodiment of this application.

In the embodiments of this application, a DRB is a data radio bearer between a terminal and a base station, and is used to bear data transmitted between the base station and the terminal. FIG. 2*a* is a schematic diagram of a DRB according to an embodiment of this application, FIG. 2*b* is another schematic diagram of a DRB according to an embodiment of this application, and FIG. 2*c* is still another schematic diagram of a DRB according to an embodiment of this application. It can be learned from FIG. 2*a* to FIG. 2*c* that DRB types provided in the embodiments of this application include a master cell group bearer (MCG bearer), a secondary cell group bearer (SCG bearer), and a split bearer. The split bearer further includes a split bearer with data anchored on a master base station and a split bearer with data anchored on a secondary base station. The split bearer with data anchored on the master base station may be referred to as a master cell group split bearer (MCG split bearer), and the split bearer with data anchored on the secondary base station may be referred to as a secondary cell group split bearer (SCG split bearer).

Specifically, the MCG bearer is a bearer whose air interface protocol is specific only to the master base station, to use a transmission resource of the master base station. Therefore, uplink or downlink data on the MCG bearer is transmitted only through the master base station. The SCG bearer is a bearer whose air interface protocol is specific only to the secondary base station, to use a transmission resource of the secondary base station. Therefore, uplink or downlink data on the SCG bearer is transmitted only through the secondary base station. The split bearer is a bearer whose air interface protocol is specific to both the master base station and the secondary base station, to use both a transmission resource of the master base station and a transmission resource of the secondary base station. Therefore, both the master base station and the secondary base station may transmit data with a terminal. Further, for the split bearer, if the MCG split bearer is used, in a downlink direction, a packet data convergence protocol (PDCP) layer of the master base station splits, for the secondary base station, downlink data delivered by a core network, and the secondary base station sends the split downlink data to the terminal; and in an uplink direction, if splitting is supported in the uplink direction, the master base station and the secondary base station separately receive uplink data from the terminal, the secondary base station sends the received uplink data to the master base station, and the master base station reorders the uplink data separately received by the master base station and the secondary base station, and then sequentially sends the received data to the core network. If the SCG split bearer is used, in a downlink direction, a PDCP layer of the secondary base station splits, for the master base station, downlink data delivered by a core network, and the master base station sends the split downlink data to the terminal; and in an uplink direction, if splitting is supported in the uplink direction, the master base station and the secondary base station separately receive uplink data from the terminal, the master base station sends the received uplink data to the secondary base station, and the secondary base station reorders the uplink data separately received by the master base station and the secondary base station, and then sequentially sends the received data to the core network. It may be understood that, for the MCG bearer and the SCG bearer, data transmitted on the master base station and data transmitted on the secondary base station belong to different services. For example, voice service data is transmitted on the master base station, and video service data is transmitted on the secondary base station. For the split bearer, data transmitted on the master base station and data transmitted on the secondary base station are different data of a same type of service. This is not limited in the embodiments of this application.

To implement specific control of data traffic borne by a non-GBR service of UE, a concept of a UE-AMBR is introduced into a communications system. The UE-AMBR is an upper limit that is set for a sum of rates of all non-GBR services supported by one UE. This parameter is determined by a mobility management entity (MME for short). In a DC system, both a base station 0 and a base station 1 serve UE, and therefore a UE-AMBR is used to restrict a sum of rates of all non-GBR services of the UE on the two base stations, namely, a sum of transmission rates of all non-GBR services between the base station 0 and the UE and between the base station 1 and the UE, to a value not greater than the UE-AMBR.

In addition, there are a plurality of data bearing manners between the UE and each of the base station 0 and the base station 1. In different data bearing manners, each of the base station 0 and the base station 1 controls transmission rates between each of the base station 0 and the base station 1 and the UE in different manners. For example, the UE-AMBR is divided into a UE-AMBR 1 used for the base station 0 and a UE-AMBR 2 used for the base station 1. The UE-AMBR 1 further includes an uplink UE-AMBR 1 and a downlink UE-AMBR 1. Likewise, the UE-AMBR 2 further includes an uplink UE-AMBR 2 and a downlink UE-AMBR 2. It is assumed that an MCG bearer and an SCG split bearer exist on the base station 0, and only an SCG split bearer exists on the base station 1. In this case, there are three manners of controlling the sum of the rates of all the non-GBR services of the UE not to exceed the AMBR.

Manner 1: The base station 0 controls downlink transmission rates that are of the MCG bearer and the SCG split bearer and that are between the base station 0 and the UE based on the downlink UE-AMBR 1. The base station 1 controls a downlink transmission rate that is of the SCG split bearer and that is between the base station 1 and the UE based on the downlink UE-AMBR 2. If the base station 0 is configured to transmit uplink split data, the base station 0 controls uplink transmission rates that are of the MCG bearer and the SCG split bearer and that are between the base station 0 and the UE based on the uplink UE-AMBR 1. If the base station 1 is configured to transmit uplink split data, the base station 1 controls an uplink transmission rate that is of the SCG split bearer and that is between the base station 1 and the UE based on the uplink UE-AMBR 2.

Manner 2: The base station 0 controls a downlink transmission rate that is of the MCG bearer and that is between the base station 0 and the UE based on the downlink UE-AMBR 1. The base station 1 controls downlink transmission rates that are of the SCG split bearer and that are respectively between the base station 0 and the UE and between the base station 1 and the UE based on the downlink UE-AMBR 2. If the base station 0 is configured to transmit uplink split data, the base station 0 controls uplink transmission rates that are of the MCG bearer and the SCG split bearer and that are between the base station 0 and the UE based on the uplink UE-AMBR 1. If the base station 1 is configured to transmit uplink split data, the base station 1 controls an uplink transmission rate that is of the SCG split bearer and that is between the base station 1 and the UE based on the uplink UE-AMBR 2.

Manner 3: The UE-AMBR 1 used for the base station 0 is further divided into a UE-AMBR 3 used for the MCG bearer and a UE-AMBR 4 used for the SCG split bearer. All the UE-AMBRs 1 further include uplink UE-AMBRs and downlink UE-AMBRs. The base station 0 controls a downlink transmission rate that is of the MCG bearer and that is between the base station 0 and the UE based on the downlink UE-AMBR 3. The base station 1 controls a downlink transmission rate that is of the SCG split bearer and that is between the base station 0 and the UE based on the downlink UE-AMBR 4. The base station 1 controls a downlink transmission rate that is of the SCG split bearer and that is between the base station 1 and the UE based on the downlink UE-AMBR 2. If the base station 0 is configured to transmit uplink split data, the base station 0 controls uplink transmission rates that are of the MCG bearer and the SCG split bearer and that are between the base station 0 and the UE based on the uplink UE-AMBR 3 and the uplink UE-AMBR 4. If the base station 1 is configured to transmit uplink split data, the base station 1 controls an uplink transmission rate that is of the SCG split bearer and that is between the base station 1 and the UE based on the uplink UE-AMBR 2.

Therefore, the transmission rate control method and the device provided in the embodiments of this application are intended to resolve a technical problem of how to allocate a UE-AMBR to control a transmission rate between each base station and a UE in a DC system.

The following describes in detail technical solutions of this application by using specific embodiments. The following several specific embodiments may be combined with each other, and a same or similar concept or process may not be described repeatedly in some embodiments.

In addition, it should be noted that the method in the embodiments of this application is not limited to the application scenario shown in FIG. 1. In actual application, the method may also be applied to a multi-connectivity system. To be specific, there may be a plurality of base stations. When there are a plurality of base stations, a specific implementation principle and implementation process are similar to those in the DC system, and details are not described herein again.

Figure 3:
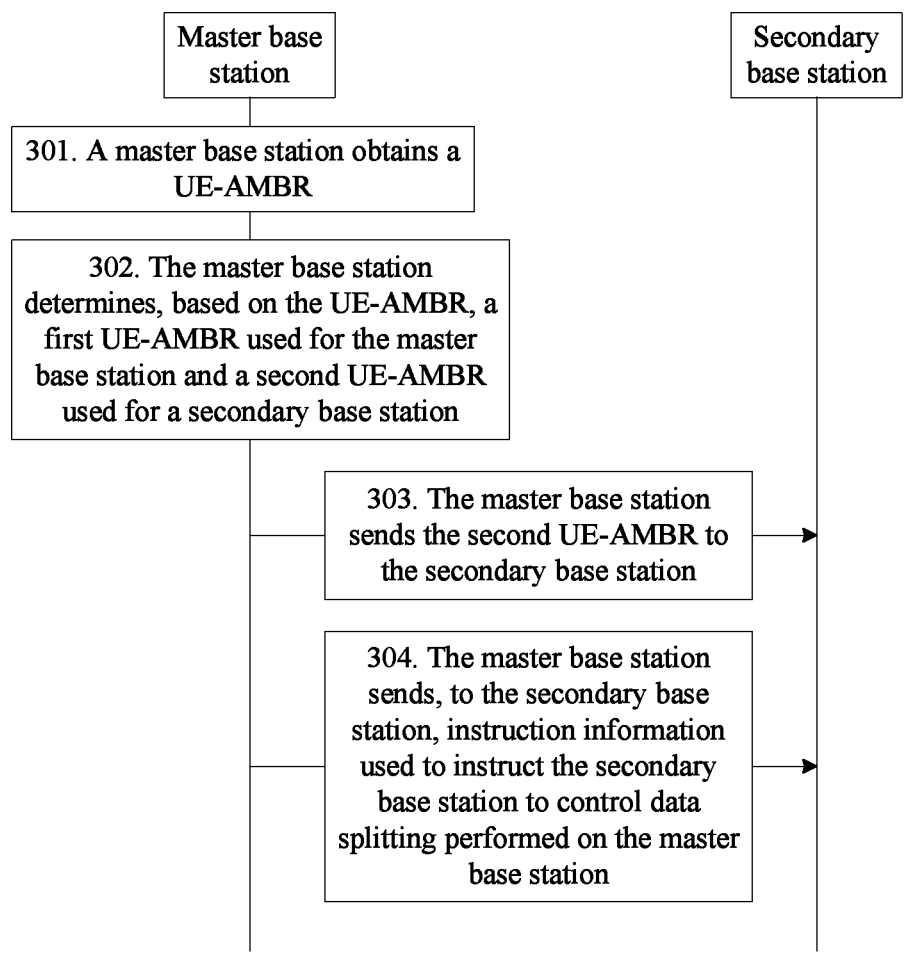
FIG. 3 is a signaling flowchart of Embodiment 1 of a transmission rate control method according to this application.

FIG. 3 is a signaling flowchart of Embodiment 1 of a transmission rate control method according to this application. Based on the system architecture shown in FIG. 1, as shown in FIG. 3, the method in this embodiment may include the following steps.

Step 301: A master base station obtains a UE-AMBR.

In this embodiment of this application, there is a control plane connection between the master base station and a core network. Therefore, the master base station may obtain the UE-AMBR from the core network. For example, when the master base station is an LTE base station, the master base station may obtain the UE-AMBR from an MME of the core network, and the UE-AMBR may be any value from 0 bit/s to $10^{10}$ bit/s.

Step 302: The master base station determines, based on the UE-AMBR, a first UE-AMBR used for the master base station and a second UE-AMBR used for a secondary base station.

In this embodiment, after obtaining the UE-AMBR, the master base station determines the first UE-AMBR and the second UE-AMBR based on the UE-AMBR. The master base station controls a transmission rate between the master base station and a UE based on the first UE-AMBR, and the secondary base station controls a transmission rate between the secondary base station and the UE based on the second UE-AMBR. The first UE-AMBR may further include an uplink first UE-AMBR and a downlink first UE-AMBR. Likewise, the second UE-AMBR further includes an uplink second UE-AMBR and a downlink second UE-AMBR.

In addition, a sum of the first UE-AMBR and the second UE-AMBR may be equal to the UE-AMBR, or may be less than the UE-AMBR. For example, 60% of the UE-AMBR may be determined as the first UE-AMBR, in other words, the 60% of the UE-AMBR is allocated to the master base station for use, and 40% of the UE-AMBR may be determined as the second UE-AMBR, in other words, the 40% of the UE-AMBR is allocated to the secondary base station for use. In this case, the sum of the first UE-AMBR and the second UE-AMBR is equal to the UE-AMBR. Certainly, 60% of the UE-AMBR may be allocated to the master base station for use, and 20% of the UE-AMBR may be allocated to the secondary base station for use. In this case, the sum of the first UE-AMBR and the second UE-AMBR is less than the UE-AMBR. In actual application, the master base station may randomly determine the first UE-AMBR and the second UE-AMBR, may determine the first UE-AMBR and the second UE-AMBR based on network resource status information of the master base station, or may determine the first UE-AMBR and the second UE-AMBR based on a specific application scenario. The network resource status information may include, for example, an air interface link status and load information.

Step 303: The master base station sends the second UE-AMBR to the secondary base station.

In this embodiment, the master base station sends the second UE-AMBR to the secondary base station, and further sends the uplink second UE-AMBR and the downlink second UE-AMBR to the secondary base station.

Step 304: The master base station sends, to the secondary base station, instruction information used to instruct the secondary base station to control data splitting for the master base station.

In this embodiment, after determining the second UE-AMBR, the master base station sends the second UE-AMBR to the secondary base station; and after obtaining the second UE-AMBR, the secondary base station controls the transmission rate between the secondary base station and the UE based on the second UE-AMBR. Specifically, the transmission rate between the secondary base station and the UE may be controlled by controlling resources allocated to the UE, to ensure that a sum of rates of all non-GBR services of the UE on the secondary base station does not exceed a limit of the second UE-AMBR. In addition, when a split bearer anchored on the secondary base station (SCG split bearer) exists on the master base station, the master base station further sends the instruction information to the secondary base station, and the secondary base station controls, based on the received instruction information, a rate of sending split data to the master base station.

It may be understood that the foregoing order in which step 303 and step 304 are performed is merely an example. Step 303 and step 304 are performed in no particular order. Step 303 may be performed before step 304, step 304 may be performed before step 303, or the two steps may be simultaneously performed. This is not particularly limited in this embodiment of this application.

In addition, the master base station may send the second UE-AMBR to the secondary base station by adding the second UE-AMBR to signaling or a message. For example, the master base station may add the second UE-AMBR to a secondary base station addition request (SgNB Addition Request) message or a secondary base station modification request (SgNB Modification Request) message. Alternatively, the master base station may send the second UE-AMBR to the secondary base station by adding the second UE-AMBR to another dedicated message, or the like.

Likewise, the master base station may send the instruction information to the secondary base station by adding the instruction information to signaling or a message. For example, the master base station may add the instruction information to a flow control message that is fed back by the master base station to the secondary base station, or may add the instruction information to a secondary base station addition request (SgNB Addition Request) message or a secondary base station modification request (SgNB Modification Request) message. Alternatively, the master base station may send the instruction information to the secondary base station by adding the instruction information to another dedicated message. The second UE-AMBR and the instruction information may be carried in a same message or different messages for sending.

According to the transmission rate control method provided in this embodiment of this application, the master base station obtains the UE-AMBR, and determines, based on the UE-AMBR, the first UE-AMBR used for the master base station and the second UE-AMBR used for the secondary base station, and the master base station may send the second UE-AMBR to the secondary base station, and may further send, to the secondary base station, the instruction information used to instruct the secondary base station to control data splitting for the master base station. The master base station sends the second UE-AMBR and the instruction information to the secondary base station, so that the secondary base station can control the transmission rate between the secondary base station and the UE based on the second UE-AMBR, and control, based on the instruction information, the transmission rate of performing data splitting for the master base station, and the master base station controls the transmission rate between the master base station and the UE based on the first UE-AMBR.

The following describes in detail how each of the master base station and the secondary base station controls uplink and downlink transmission rates between each of the master base station and the secondary base station and the UE in several different data bearing manners.

Manner 1: When only the split bearer anchored on the secondary base station (SCG split bearer) exists on the master base station, the instruction information is a third UE-AMBR, and the third UE-AMBR is equal to the first UE-AMBR.

Specifically, when only the split bearer anchored on the secondary base station (SCG split bearer) is configured on the master base station, that is, when all non-GBR services of the UE support the SCG split bearer, the instruction information that is sent by the master base station to the secondary base station is the third UE-AMBR that is equal to the first UE-AMBR. The third UE-AMBR includes an uplink third UE-AMBR (equal to the uplink first UE-AMBR) and a downlink third UE-AMBR (equal to the downlink first UE-AMBR). Therefore, the secondary base station controls, based on the received downlink third UE-AMBR, a downlink transmission rate of performing data splitting for the master base station, to control the downlink transmission rate between the master base station and the UE.

In addition, the master base station further needs to send the second UE-AMBR to the secondary base station, and the second UE-AMBR includes the uplink second UE-AMBR and the downlink second UE-AMBR. Therefore, the secondary base station controls the downlink transmission rate between the secondary base station and the UE based on the downlink second UE-AMBR.

Optionally, in this scenario, when the master base station is configured to transmit uplink split data, the master base station controls the uplink transmission rate between the master base station and the UE based on the uplink third UE-AMBR. Specifically, because only the split bearer anchored on the secondary base station (SCG split bearer) exists on the master base station, the master base station controls an uplink transmission rate that is of the split bearer anchored on the secondary base station and that is between the master base station and the UE.

In the scenario in which only the split bearer anchored on the secondary base station (SCG split bearer) exists on the master base station, the master base station ignores the downlink first UE-AMBR, and the secondary base station controls, based on the downlink third UE-AMBR, the transmission rate of performing data splitting for the master base station, to control the downlink transmission rate between the master base station and the UE. In addition, the secondary base station controls the downlink transmission rate between the secondary base station and the UE based on the downlink second UE-AMBR. For uplink data transmission, when uplink split data is transmitted on the secondary base station, the secondary base station controls the uplink transmission rate between the secondary base station and the UE based on the uplink second UE-AMBR, and when uplink split data is transmitted on the master base station, the master base station controls the uplink transmission rate between the master base station and the UE based on the uplink first UE-AMBR, to control a transmission rate between each base station and the UE.

Manner 2: When only the split bearer anchored on the secondary base station (SCG split bearer) exists on the master base station, the instruction information is splitting control information.

Specifically, in comparison with the first scenario, in this scenario, the master base station sends the splitting control information to the secondary base station instead of sending the third UE-AMBR to the secondary base station. The splitting control information includes data buffer-related information of the master base station and/or data sending-related information of the master base station, or a data transmission rate of the master base station, or the like. When only the split bearer anchored on the secondary base station (SCG split bearer) is configured on the master base station, that is, when all non-GBR services of the UE support the SCG split bearer, the instruction information that is sent by the master base station to the secondary base station is the splitting control information. In this case, the secondary base station controls, based on the received splitting control information, a downlink transmission rate of performing data splitting for the master base station, to control the downlink transmission rate between the master base station and the UE. For example, if the secondary base station learns, based on the splitting control information, that an amount of data in a buffer of the master base station is less than a preset threshold, the secondary base station may increase the downlink transmission rate of performing data splitting for the master base station and the like.

It should be noted that the secondary base station controls, based only on the splitting control information, the downlink transmission rate of performing data splitting for the master base station. Therefore, after the secondary base station performs data splitting for the master base station, the master base station controls the downlink transmission rate between the master base station and the UE based on the first UE-AMBR. Specifically, the master base station controls a downlink transmission rate that is of the split bearer anchored on the secondary base station and that is between the master base station and the UE based on the downlink first UE-AMBR.

In addition, the master base station further needs to send the second UE-AMBR to the secondary base station. Therefore, the secondary base station controls the downlink transmission rate between the secondary base station and the UE based on the second UE-AMBR. Specifically, the secondary base station controls the downlink transmission rate between the secondary base station and the UE based on the downlink second UE-AMBR.

Specifically, only the split bearer anchored on the secondary base station (SCG split bearer) exists on the master base station. Therefore, when uplink split data is transmitted on the master base station, the master base station controls an uplink transmission rate that is of the split bearer anchored on the secondary base station and that is between the master base station and the UE based on the uplink first UE-AMBR.

In this scenario, the secondary base station controls, based on the splitting control information, the transmission rate of performing data splitting for the master base station. Therefore, the master base station controls the downlink transmission rate between the master base station and the UE based on the downlink first UE-AMBR. In addition, the secondary base station controls the downlink transmission rate between the secondary base station and the UE based on the downlink second UE-AMBR. For uplink data transmission, when uplink split data is transmitted on the secondary base station, the secondary base station controls the uplink transmission rate between the secondary base station and the UE based on the uplink second UE-AMBR, and when uplink split data is transmitted on the master base station, the master base station controls the uplink transmission rate between the master base station and the UE based on the uplink first UE-AMBR, to control a transmission rate between each base station and the UE.

Manner 3: When both the split bearer anchored on the secondary base station (SCG split bearer) and a master cell group bearer (MCG bearer) exist on the master base station, the instruction information is a fourth UE-AMBR, and the fourth UE-AMBR is less than the first UE-AMBR.

Specifically, when both the split bearer anchored on the secondary base station (SCG split bearer) and the master cell group bearer (MCG bearer) exist on the master base station, some non-GBR services of the UE are configured as the MCG bearer, and other non-GBR services of the UE are configured as the SCG split bearer. Therefore, data on the master base station includes two parts: data split from the secondary base station and data individually borne on the master base station. In this case, the master base station needs to control a sum of transmission rates of the two parts of data not to be greater than the first UE-AMBR. Therefore, the instruction information that is sent by the master base station to the secondary base station is the fourth UE-AMBR, and the fourth UE-AMBR is less than the first UE-AMBR. Therefore, the secondary base station controls, based on the received fourth UE-AMBR, a downlink transmission rate of performing data splitting for the master base station, so that the downlink transmission rate is not greater than the fourth UE-AMBR.

It should be noted that both the split bearer anchored on the secondary base station (SCG split bearer) and the master cell group bearer (MCG bearer) exist on the master base station. Therefore, after the secondary base station performs data splitting for the master base station, the master base station controls the downlink transmission rate between the master base station and the UE based on the first UE-AMBR. Specifically, the master base station controls downlink transmission rates that are of the master cell group bearer and the split bearer anchored on the secondary base station and that are between the master base station and the UE based on the downlink first UE-AMBR.

In addition, the master base station further needs to send the second UE-AMBR to the secondary base station. Therefore, the secondary base station controls the downlink transmission rate between the secondary base station and the UE based on the second UE-AMBR. Specifically, the secondary base station controls the downlink transmission rate between the secondary base station and the UE based on the downlink second UE-AMBR.

Optionally, in this scenario, when the master base station is configured to transmit uplink split data, the master base station controls the uplink transmission rate between the master base station and the UE based on the first UE-AMBR. Specifically, the master base station controls uplink transmission rates that are of the master cell group bearer and the split bearer anchored on the secondary base station and that are between the master base station and the UE based on the uplink first UE-AMBR.

In the scenario in which both the split bearer anchored on the secondary base station (SCG split bearer) and the master cell group bearer (MCG bearer) exist on the master base station, the secondary base station controls, based on the fourth UE-AMBR, the transmission rate of performing data splitting for the master base station, and the master base station controls the downlink transmission rate between the master base station and the UE based on the downlink first UE-AMBR. In addition, the secondary base station controls the downlink transmission rate between the secondary base station and the UE based on the downlink second UE-AMBR. For uplink data transmission, when uplink split data is transmitted on the secondary base station, the secondary base station controls the uplink transmission rate between the secondary base station and the UE based on the uplink second UE-AMBR, and when uplink split data is transmitted on the master base station, the master base station controls the uplink transmission rate between the master base station and the UE based on the uplink first UE-AMBR, to control a transmission rate between each base station and the UE.

Manner 4: When both the split bearer anchored on the secondary base station (SCG split bearer) and a master cell group bearer (MCG bearer) exist on the master base station, the instruction information is splitting control information.

Specifically, the splitting control information includes data buffer-related information of the master base station and/or data sending-related information of the master base station, or a data transmission rate of the master base station, or the like. When both the split bearer anchored on the secondary base station (SCG split bearer) and the master cell group bearer (MCG bearer) exist on the master base station, some non-GBR services of the UE are configured as the MCG bearer, and other non-GBR services of the UE are configured as the SCG split bearer. Therefore, data on the master base station includes two parts: data split from the secondary base station and data individually borne on the master base station. In this case, the master base station needs to control a sum of transmission rates of the two parts of data not to be greater than the first UE-AMBR. In a specific implementation process, the instruction information that is sent by the master base station to the secondary base station is the splitting control information. In this case, the secondary base station controls, based on the received splitting control information, a downlink transmission rate of performing data splitting for the master base station. For example, if the secondary base station learns, based on the splitting control information, that an amount of data in a buffer of the master base station is less than a preset threshold, the secondary base station may increase the downlink transmission rate of performing data splitting for the master base station and the like.

In addition, the secondary base station controls, based only on the splitting control information, the downlink transmission rate of performing data splitting for the master base station. Therefore, after the secondary base station performs data splitting for the master base station, the master base station controls the downlink transmission rate between the master base station and the UE based on the first UE-AMBR. Specifically, the master base station controls downlink transmission rates that are of the master cell group bearer and the split bearer anchored on the secondary base station and that are between the master base station and the UE based on the downlink first UE-AMBR.

In addition, the master base station further needs to send the second UE-AMBR to the secondary base station. Therefore, the secondary base station controls the downlink transmission rate between the secondary base station and the UE based on the second UE-AMBR. Specifically, the secondary base station controls the downlink transmission rate between the secondary base station and the UE based on the downlink second UE-AMBR.

Optionally, in this scenario, when the master base station is configured to transmit uplink split data, the master base station controls the uplink transmission rate between the master base station and the UE based on the first UE-AMBR. Specifically, the master base station controls uplink transmission rates that are of the master cell group bearer and the split bearer anchored on the secondary base station and that are between the master base station and the UE based on the uplink first UE-AMBR.

In this scenario, the secondary base station controls, based on the splitting control information, the transmission rate of performing data splitting for the master base station. Therefore, the master base station controls the downlink transmission rate between the master base station and the UE based on the downlink first UE-AMBR. In addition, the secondary base station controls the downlink transmission rate between the secondary base station and the UE based on the downlink second UE-AMBR. For uplink data transmission, when uplink split data is transmitted on the secondary base station, the secondary base station controls the uplink transmission rate between the secondary base station and the UE based on the uplink second UE-AMBR, and when uplink split data is transmitted on the master base station, the master base station controls the uplink transmission rate between the master base station and the UE based on the uplink first UE-AMBR, to control a transmission rate between each base station and the UE.

Figure 4:
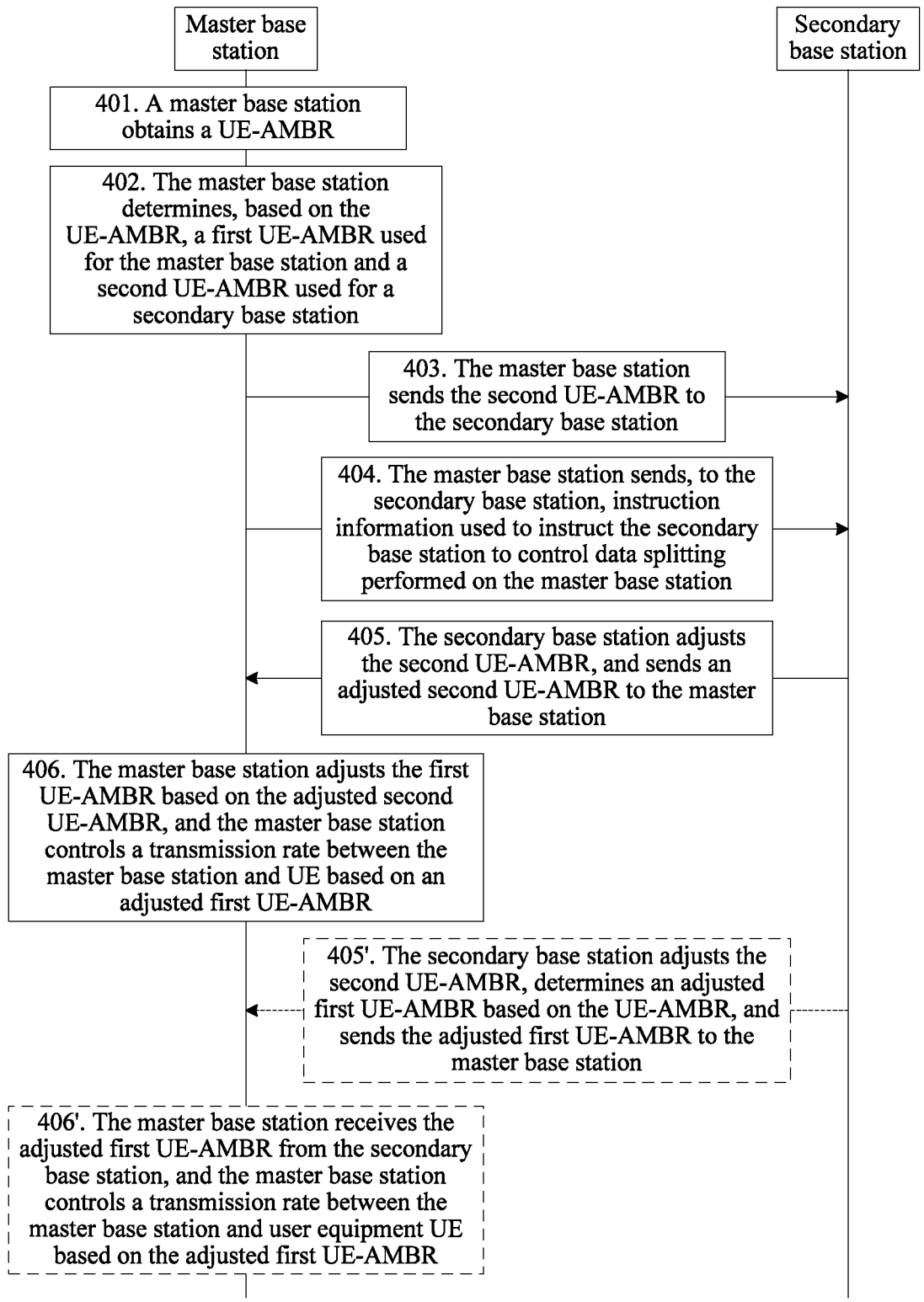
FIG. 4 is a signaling flowchart of Embodiment 2 of a transmission rate control method according to this application.

FIG. 4 is a signaling flowchart of Embodiment 2 of a transmission rate control method according to this application. Based on the embodiment shown in FIG. 3, this embodiment in which a secondary base station adjusts a second UE-AMBR after a master base station sends the second UE-AMBR to the secondary base station is described in detail. As shown in FIG. 4, the method in this embodiment may include the following steps.

Step 401: The master base station obtains a UE-AMBR.

Step 402: The master base station determines, based on the UE-AMBR, a first UE-AMBR used for the master base station and the second UE-AMBR used for the secondary base station.

Step 403: The master base station sends the second UE-AMBR to the secondary base station.

Step 404: The master base station sends, to the secondary base station, instruction information used to instruct the secondary base station to control data splitting for the master base station.

Step 401 to step 404 are similar to step 301 to step 304, and details are not described herein again.

Step 405: The secondary base station adjusts the second UE-AMBR, and sends an adjusted second UE-AMBR to the master base station.

In this embodiment, after receiving the second UE-AMBR sent by the master base station, the secondary base station may determine, based on network resource status information of the secondary base station, whether the received second UE-AMBR needs to be adjusted, and if the received second UE-AMBR needs to be adjusted, adjust the second UE-AMBR, and send the adjusted second UE-AMBR to the master base station. The network resource status information may include, for example, air interface signal quality and/or a load status, or other information. In a possible implementation, when the secondary base station finds that the air interface signal quality of the secondary base station is greater than a first preset threshold and/or that load is less than a second preset threshold, the secondary base station may increase the second UE-AMBR while the UE-AMBR remains unchanged. Alternatively, when the secondary base station finds that the air interface signal quality of the secondary base station is less than a third preset threshold and/or that load is greater than a fourth preset threshold, the secondary base station may decrease the second UE-AMBR while the UE-AMBR remains unchanged. For example, 60% of the UE-AMBR is the first UE-AMBR, in other words, the 60% of the UE-AMBR is allocated to the master base station for use, and 40% of the UE-AMBR is the second UE-AMBR, in other words, the 40% of the UE-AMBR is allocated to the secondary base station for use. In this case, if the secondary base station finds that the air interface signal quality of the secondary base station is relatively good and/or that the load is relatively low, the secondary base station adjusts the second UE-AMBR to 80% of the UE-AMBR, and sends the adjusted second UE-AMBR to the master base station, so that the master base station obtains an adjusted first UE-AMBR based on the adjusted second UE-AMBR and the UE-AMBR. In addition, if the secondary base station finds that the air interface signal quality of the secondary base station is relatively poor and/or that the load is relatively high, the secondary base station adjusts the second UE-AMBR to 20% of the UE-AMBR, and sends the adjusted second UE-AMBR to the master base station.

In addition, the secondary base station may send the adjusted second UE-AMBR to the master base station by adding the adjusted second UE-AMBR to a signaling message, for example, adding the adjusted second UE-AMBR to a secondary base station addition request acknowledge (SgNB Addition Request Acknowledge) message or a secondary base station modification request acknowledge (SgNB Modification Request Acknowledge) message. Certainly, the secondary base station may alternatively send the adjusted second UE-AMBR to the master base station by adding the adjusted second UE-AMBR to another message.

Step 406: The master base station adjusts the first UE-AMBR based on the adjusted second UE-AMBR, and the master base station controls a transmission rate between the master base station and a UE based on the adjusted first UE-AMBR.

In this embodiment, after the secondary base station sends the adjusted second UE-AMBR to the master base station, the master base station adjusts the first UE-AMBR based on the adjusted second UE-AMBR. The adjusted first UE-AMBR includes an adjusted uplink first UE-AMBR and an adjusted downlink first UE-AMBR. In this way, the master base station may control a downlink transmission rate between the master base station and the UE based on the adjusted downlink first UE-AMBR. When an uplink non-GBR service is transmitted on the master base station, the master base station controls an uplink transmission rate between the master base station and the UE based on the adjusted uplink first UE-AMBR, and the secondary base station controls a transmission rate between the secondary base station and the UE based on the adjusted second UE-AMBR. For example, the 60% of the UE-AMBR is the first UE-AMBR, and the 40% of the UE-AMBR is the second UE-AMBR. After the secondary base station adjusts the second UE-AMBR to the 80% of the UE-AMBR, the master base station adjusts the first UE-AMBR to the 20% of the UE-AMBR while the UE-AMBR remains unchanged.

In this embodiment, after the secondary base station sends the adjusted second UE-AMBR to the master base station, the master base station adjusts the first UE-AMBR based on the adjusted second UE-AMBR. This is a possible implementation of an adjustment solution of the secondary base station.

In another implementation of this application, after steps 401 to 403, the following steps are further performed.

Step 405': The secondary base station adjusts the second UE-AMBR, determines an adjusted first UE-AMBR based on the UE-AMBR, and sends the adjusted first UE-AMBR to the master base station.

In this embodiment, step 405' is different from step 405 in that after adjusting the second UE-AMBR based on network resource status information, the secondary base station does not send an adjusted second UE-AMBR to the master base station, but determines the adjusted first UE-AMBR based on the adjusted second UE-AMBR while the UE-AMBR remains unchanged, and sends the adjusted first UE-AMBR to the master base station.

It should be noted that in step 405', the master base station further needs to send the UE-AMBR to the secondary base station, so that the secondary base station can determine the adjusted first UE-AMBR based on the UE-AMBR and the adjusted second UE-AMBR.

Optionally, if 60% of the UE-AMBR is the first UE-AMBR, and 40% of the UE-AMBR is the second UE-AMBR, after the secondary base station adjusts the second UE-AMBR to 80% of the UE-AMBR based on the network resource status information, the secondary base station determines that the adjusted first UE-AMBR is 20% of the UE-AMBR while the UE-AMBR remains unchanged, and sends the adjusted first UE-AMBR to the master base station. In addition, a manner in which the secondary base station adjusts the second UE-AMBR based on the network resource status information is similar to the adjustment manner in step 405, and details are not described herein again.

In addition, the secondary base station may send the adjusted first UE-AMBR to the master base station by adding the adjusted first UE-AMBR to a signaling message, for example, adding the adjusted first UE-AMBR to a secondary base station addition request acknowledge (SgNB Addition Request Acknowledge) message or a secondary base station modification request acknowledge (SgNB Modification Request Acknowledge) message. Certainly, the secondary base station may alternatively send the adjusted first UE-AMBR to the master base station by adding the adjusted first UE-AMBR to another message.

Step 406': The master base station receives the adjusted first UE-AMBR from the secondary base station, and the master base station controls a transmission rate between the master base station and user equipment UE based on the adjusted first UE-AMBR.

In this embodiment, step 406' is different from step 406 in that in this step, the secondary base station sends the adjusted first UE-AMBR to the master base station. The adjusted first UE-AMBR includes an adjusted uplink first UE-AMBR and an adjusted downlink first UE-AMBR. Therefore, the master base station may control a downlink transmission rate between the master base station and the UE based on the adjusted downlink first UE-AMBR. When there is an uplink non-GBR service on the master base station, the master base station directly controls an uplink transmission rate between the master base station and the UE based on the adjusted uplink first UE-AMBR that is sent by the secondary base station, and the secondary base station controls a transmission rate between the secondary base station and the UE based on the adjusted downlink second UE-AMBR.

In this embodiment, the secondary base station sends the adjusted first UE-AMBR and the adjusted second UE-AMBR to the master base station, and the master base station controls the transmission rate between the master base station and the UE based on the received adjusted first UE-AMBR, in other words, the master base station does not adjust the first UE-AMBR and the second UE-AMBR. Therefore, a signaling resource of the master base station can be saved.

According to the transmission rate control method provided in this embodiment of this application, after the master base station sends the second UE-AMBR to the secondary base station, the secondary base station may flexibly adjust the second UE-AMBR based on a network load status of the secondary base station, and control the transmission rate between the secondary base station and the UE based on the adjusted second UE-AMBR, and after obtaining the adjusted first UE-AMBR based on the adjusted second UE-AMBR, the master base station controls the transmission rate between the master base station and the UE based on the adjusted first UE-AMBR. Therefore, rationality and flexibility of data transmission rate control can be improved.

In addition, after obtaining the second UE-AMBR, the secondary base station adjusts the second UE-AMBR based on the network resource status information, and determines the adjusted first UE-AMBR, so that the master base station can control the downlink transmission rate between the master base station and the UE based on the adjusted downlink first UE-AMBR. When an uplink non-GBR service is transmitted on the master base station, the master base station controls the uplink transmission rate between the master base station and the UE based on the adjusted uplink first UE-AMBR, and the secondary base station controls the transmission rate between the secondary base station and the UE based on the adjusted downlink second UE-AMBR. Therefore, a sum of rates of all non-GBR services of a user does not exceed a limit of the UE-AMBR, thereby improving utilization of the UE-AMBR.

Optionally, to improve the utilization of the UE-AMBR, the master base station may further obtain the network resource status information of the secondary base station, and the determining, by the master base station based on the UE-AMBR, a first UE-AMBR used for the master base station and a second UE-AMBR used for the secondary base station includes: determining, by the master base station, the first UE-AMBR and the second UE-AMBR based on the network resource status information and the UE-AMBR.

Specifically, before determining the first UE-AMBR and the second UE-AMBR, the master base station may first obtain the network resource status information of the secondary base station, for example, obtain an air interface link status and/or a load status of the secondary base station, and divide the UE-AMBR based on the obtained network resource status information, to obtain the first UE-AMBR and the second UE-AMBR. For example, if obtained air interface link quality of the secondary base station is greater than a fifth preset threshold and/or load is less than a sixth preset threshold, the master base station may determine 80% of the UE-AMBR as the first UE-AMBR, and determine 20% of the UE-AMBR as the second UE-AMBR.

Optionally, the master base station may alternatively first obtain network resource status information of the master base station, for example, obtain an air interface link status and/or a load status of the master base station, and divide the UE-AMBR based on the obtained network resource status information of the master base station, to obtain the first UE-AMBR and the second UE-AMBR. For example, if obtained air interface link quality of the master base station is greater than a seventh preset threshold and/or load is less than an eighth preset threshold, the master base station may determine 70% of the UE-AMBR as the first UE-AMBR, and determine 30% of the UE-AMBR as the second UE-AMBR.

Optionally, the master base station may alternatively divide the UE-AMBR with reference to network resource status information of the master base station and the network resource status information of the secondary base station, to obtain the first UE-AMBR and the second UE-AMBR. Because the master base station may determine the first UE-AMBR and the second UE-AMBR based on the network resource status information of the master base station and the network resource status information of the secondary base station, the utilization of the UE-AMBR can be further improved.

In addition, the master base station may obtain the network resource status information of the secondary base station in the following two manners: (1). The master base station periodically obtains the network resource status information of the secondary base station. An obtaining period may be set based on an actual case or experience, for example, may be set to 1 min or 2 min. A specific value of the obtaining period is not limited in this embodiment herein. (2). The master base station sends, to the secondary base station, a request message used to obtain the network resource status information, and receives a response message returned by the secondary base station. The response message includes the network resource status information of the secondary base station.

According to the transmission rate control method provided in this embodiment of this application, the master base station obtains the network resource status information of the secondary base station, and determines the first UE-AMBR and the second UE-AMBR based on the network resource status information and the UE-AMBR. Therefore, not only transmission rates of the master base station and the secondary base station can be controlled more properly, but also the utilization of the UE-AMBR can be improved.

Figure 5:
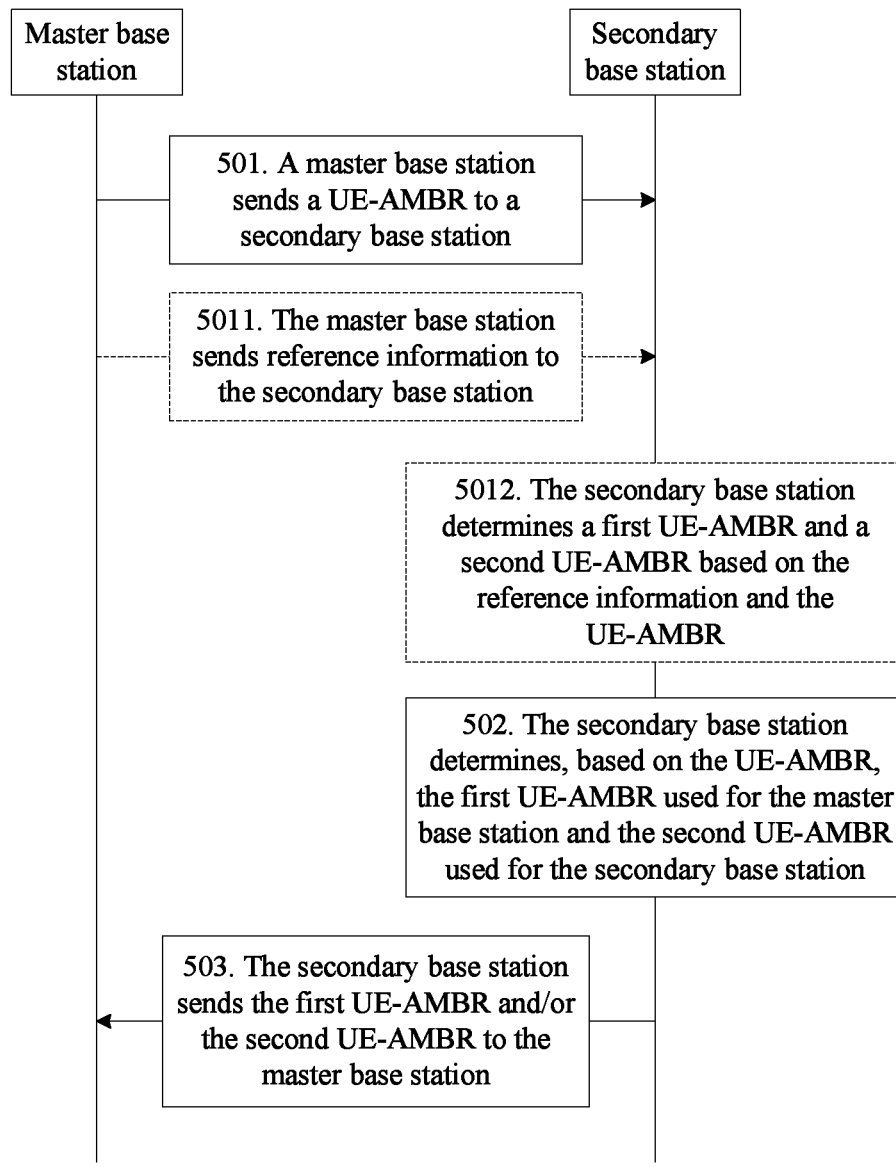
FIG. 5 is a signaling flowchart of Embodiment 3 of a transmission rate control method according to this application.

FIG. 5 is a signaling flowchart of Embodiment 3 of a transmission rate control method according to this application. The embodiment shown in FIG. 5 is different from the embodiment shown in FIG. 3 in that in the embodiment shown in FIG. 5, a secondary base station determines, based on a UE-AMBR, a first UE-AMBR used for a master base station and a second UE-AMBR used for the secondary base station. Based on the system architecture shown in FIG. 1, as shown in FIG. 5, the method in this embodiment may include the following steps.

Step 501: The master base station sends a UE-AMBR to the secondary base station.

In this embodiment, there is a control plane connection between the master base station and a core network. Therefore, only the master base station can obtain the UE-AMBR from the core network, and the master base station sends the obtained UE-AMBR to the secondary base station. In actual application, the master base station may send the UE-AMBR to the secondary base station by adding the UE-AMBR to a signaling message. For example, the master base station may add the UE-AMBR to a secondary base station addition request (SgNB Addition Request) message or a secondary base station modification request (SgNB Modification Request) message. Certainly, the master base station may alternatively send the UE-AMBR to the secondary base station by adding the UE-AMBR to another message.

Step 502: The secondary base station determines, based on the UE-AMBR, a first UE-AMBR used for the master base station and a second UE-AMBR used for the secondary base station.

In this embodiment, after obtaining the UE-AMBR, the secondary base station determines the first UE-AMBR and the second UE-AMBR based on the UE-AMBR. The master base station controls a transmission rate between the master base station and a UE based on the first UE-AMBR, and the secondary base station controls a transmission rate between the secondary base station and the UE based on the second UE-AMBR.

In addition, a sum of the first UE-AMBR and the second UE-AMBR may be equal to the UE-AMBR, or may be less than the UE-AMBR. For example, 60% of the UE-AMBR may be determined as the first UE-AMBR, in other words, the 60% of the UE-AMBR is allocated to the master base station for use, and 40% of the UE-AMBR may be determined as the second UE-AMBR, in other words, the 40% of the UE-AMBR is allocated to the secondary base station for use. In this case, the sum of the first UE-AMBR and the second UE-AMBR is equal to the UE-AMBR. Certainly, 60% of the UE-AMBR may be allocated to the master base station for use, and 20% of the UE-AMBR may be allocated to the secondary base station for use. In this case, the sum of the first UE-AMBR and the second UE-AMBR is less than the UE-AMBR. In actual application, the secondary base station may randomly determine the first UE-AMBR and the second UE-AMBR, may determine the first UE-AMBR and the second UE-AMBR based on network resource status information of the secondary base station, or may determine the first UE-AMBR and the second UE-AMBR based on a specific application scenario. The network resource status information may include, for example, an air interface link status and load information.

Step 503: The secondary base station sends the first UE-AMBR and/or the second UE-AMBR to the master base station.

In this embodiment, after determining the first UE-AMBR and the second UE-AMBR, the secondary base station may send only the first UE-AMBR to the master base station. Alternatively, the secondary base station may send only the second UE-AMBR to the master base station. In this case, the master base station calculates the first UE-AMBR based on the UE-AMBR and the second UE-AMBR, for example, may calculate the first UE-AMBR by subtracting the second UE-AMBR from the UE-AMBR. Alternatively, the secondary base station may send both the first UE-AMBR and the second UE-AMBR to the master base station.

According to the transmission rate control method provided in this embodiment of this application, the secondary base station receives the UE-AMBR from the master base station, determines, based on the UE-AMBR, the first UE-AMBR used for the master base station and the second UE-AMBR used for the secondary base station, and sends the first UE-AMBR and/or the second UE-AMBR to the master base station, so that the master base station obtains the first UE-AMBR. The first UE-AMBR further includes an uplink first UE-AMBR and a downlink first UE-AMBR. Likewise, the second UE-AMBR further includes an uplink second UE-AMBR and a downlink second UE-AMBR. Therefore, for uplink and downlink data transmission, a specific control manner is the same as the manner described in the foregoing embodiment, and details are not described herein again.

In addition, in actual application, only the master base station can learn of an overall service status of the UE, while the secondary base station can learn of only a non-GBR service that is allocated by the master base station to the secondary base station, but does not know whether there is another non-GBR service on the master base station. Therefore, to make the determined first UE-AMBR and second UE-AMBR more accurate, optionally, as shown in FIG. 5, the following steps may be further included.

Step 5011: The master base station sends reference information to the secondary base station.

Step 5012: The secondary base station determines the first UE-AMBR and the second UE-AMBR based on the reference information and the UE-AMBR.

The reference information may include information about all non-GBR services supported by the UE or information about a non-GBR service corresponding to a master cell group bearer.

Specifically, the information about the non-GBR service may include at least one of the following parameters: a quantity of non-GBR services, a quality of service class identifier QCI corresponding to the non-GBR service, a radio access bearer identifier corresponding to the non-GBR service, or an allocation/retention priority ARP corresponding to the non-GBR service. It may be understood that the information about the non-GBR service may be another parameter that can make the secondary base station learn of a non-GBR service individually borne on the master base station.

Specifically, in the reference information, all the non-GBR services of the UE are all non-GBR services individually borne on the master base station, and the QCI corresponding to the non-GBR service borne on the master base station is a QCI corresponding to the non-GBR service individually borne on the master base station. The master base station sends the reference information to the secondary base station, and the secondary base station may learn of, based on the reference information, information related to the non-GBR service individually borne on the master base station. In this case, the secondary base station determines the first UE-AMBR and the second UE-AMBR based on the reference information and the UE-AMBR. For example, still referring to FIG. 1, if the base station 0 is the master base station, and the base station 1 is the secondary base station, when two non-GBR services on the base station 1 need to be split for the base station 1, and the base station 1 learns, based on reference information sent by the base station 0, that two non-GBR services are individually borne on the base station 0, the base station 1 allocates the UE-AMBR based on quantities of non-GBR services that are borne on the base station 0 and the base station 1. For example, the base station 0 individually bears two non-GBR services, and needs to bear data split from the two non-GBR services on the base station 1. Therefore, 60% of the UE-AMBR needs to be determined as the first UE-AMBR, and 40% of the UE-AMBR is determined as the second UE-AMBR because an amount of data of the non-GBR services on the base station 1 is smaller, or the like.

According to the transmission rate control method provided in this embodiment of this application, the secondary base station receives the UE-AMBR from the master base station, determines, based on the UE-AMBR, the first UE-AMBR used for the master base station and the second UE-AMBR used for the secondary base station, and sends the first UE-AMBR and/or the second UE-AMBR to the master base station, so that the master base station obtains the first UE-AMBR. In this way, a UE rate control manner is the same as the manner described in the foregoing embodiment, and details are not described herein again.

Figure 6:
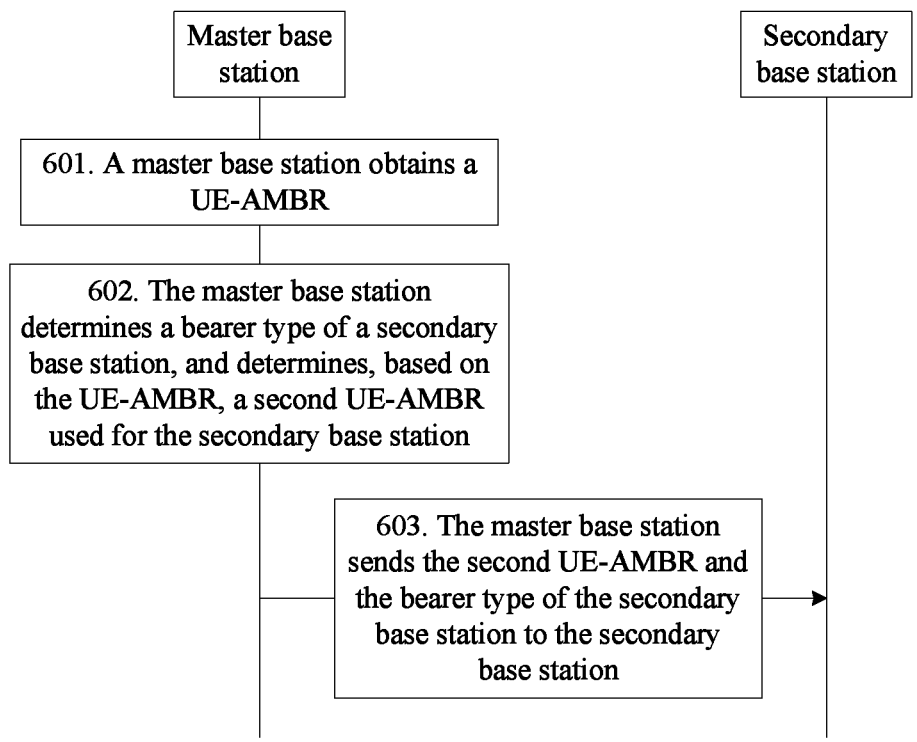
FIG. 6 is a signaling flowchart of Embodiment 4 of a transmission rate control method according to this application.

FIG. 6 is a signaling flowchart of Embodiment 4 of a transmission rate control method according to this application. In this embodiment, based on the system architecture shown in FIG. 1, as shown in FIG. 6, the method in this embodiment may include the following steps.

Step 601: A master base station obtains a UE-AMBR.

In this embodiment of this application, there is a control plane connection between the master base station and a core network. Therefore, the master base station may obtain the UE-AMBR from the core network. For example, when the master base station is an LTE base station, the master base station may obtain the UE-AMBR from an MME of the core network, and the UE-AMBR may be any value from 0 bit/s to $10^{10}$ bit/s.

Step 602: The master base station determines a bearer type of a secondary base station, and determines, based on the UE-AMBR, a second UE-AMBR used for the secondary base station.

In this embodiment, the second UE-AMBR is used by the secondary base station to control a transmission rate between the secondary base station and a UE based on the bearer type of the secondary base station. The bearer type of the secondary base station includes a type of a split bearer anchored only on a master cell group (MCG split bearer), a secondary cell group bearer (SCG bearer), and a type of a split bearer anchored on the secondary base station (SCG split bearer). However, for the secondary base station, the MCG split bearer and the SCG split bearer do not coexist, and the SCG bearer and the MCG split bearer do not coexist either. Therefore, there is only a scenario in which the SCG bearer and the SCG split bearer coexist. After obtaining the UE-AMBR, the master base station determines a first UE-AMBR and the second UE-AMBR based on the determined bearer type of the secondary base station and the UE-AMBR. The master base station controls a transmission rate between the master base station and a UE based on the first UE-AMBR, and the secondary base station controls a transmission rate between the secondary base station and the UE based on the second UE-AMBR.

Step 603: The master base station sends the second UE-AMBR and the bearer type of the secondary base station to the secondary base station.

In this embodiment, after determining the second UE-AMBR, the master base station sends the second UE-AMBR and the bearer type of the secondary base station to the secondary base station. The second UE-AMBR further includes an uplink second UE-AMBR and a downlink second UE-AMBR. After obtaining the second UE-AMBR, the secondary base station controls the transmission rate between the secondary base station and the UE based on the data bearer type of the secondary base station and the second UE-AMBR. Specifically, the secondary base station may control the transmission rate between the secondary base station and the UE by controlling resources allocated to the UE, to ensure that a sum of rates of all non-GBR services on the secondary base station does not exceed a limit of the second UE-AMBR.

In addition, the master base station may send the second UE-AMBR and the bearer type of the secondary base station to the secondary base station by adding the second UE-AMBR and the bearer type of the secondary base station to signaling or a message. For example, the master base station may add the second UE-AMBR and the bearer type to a secondary base station addition request (SgNB Addition Request) message or a secondary base station modification request (SgNB Modification Request) message. Alternatively, the master base station may send the second UE-AMBR and the bearer type of the secondary base station to the secondary base station by adding the second UE-AMBR and the bearer type to another dedicated message, or the like.

Optionally, when receiving a message including the second UE-AMBR and the bearer type, the secondary base station may obtain the second UE-AMBR and the bearer type by parsing the message.

According to the transmission rate control method provided in this embodiment of this application, the master base station obtains the UE-AMBR, determines the bearer type of the secondary base station, and determines, based on the UE-AMBR and the bearer type, the first UE-AMBR used for the master base station and the second UE-AMBR used for the secondary base station, and the master base station may send the second UE-AMBR and the bearer type to the secondary base station. The secondary base station may control the transmission rate between the secondary base station and the UE based on the second UE-AMBR and the bearer type, and the master base station controls the transmission rate between the master base station and the UE based on the first UE-AMBR.

The following describes in detail how the secondary base station controls the transmission rate between the secondary base station and the UE in a case of a different bearer type of the secondary base station.

Manner 1: When the bearer type of the secondary base station includes only the secondary cell group bearer (SCG bearer), the secondary base station controls the transmission rate between the secondary base station and the UE based on the second UE-AMBR.

When only the secondary cell group bearer (SCG bearer) is configured on the secondary base station, the secondary base station does not perform data splitting for the master base station. In this case, the secondary base station controls a downlink transmission rate between the secondary base station and the UE based on the received second UE-AMBR. Specifically, the secondary base station controls a downlink transmission rate that is of the secondary cell group bearer and that is between the secondary base station and the UE based on the received downlink second UE-AMBR.

In this scenario, the secondary base station controls an uplink transmission rate between the secondary base station and the UE based on the second UE-AMBR. Specifically, because only the secondary cell group bearer (SCG bearer) exists on the secondary base station, the secondary base station controls an uplink transmission rate that is of the secondary cell group bearer (SCG bearer) and that is between the secondary base station and the UE based on the uplink second UE-AMBR.

Manner 2: When the bearer type of the secondary base station includes only the split bearer anchored on the secondary base station (SCG split bearer), that the secondary base station controls a transmission rate between the secondary base station and the UE based on the second UE-AMBR includes: Over a downlink, based on the downlink second UE-AMBR, the secondary base station controls a downlink transmission rate that is of the split bearer anchored on the secondary base station and that is between the secondary base station and the UE, and controls a downlink transmission rate that is of the split bearer anchored on the secondary base station and that is between the master base station and the UE; or over an uplink, the secondary base station controls an uplink transmission rate that is of the split bearer anchored on the secondary base station and that is between the secondary base station and the UE based on the uplink second UE-AMBR.

Manner 3: When the bearer type of the secondary base station includes the secondary cell group bearer (SCG bearer) and the split bearer anchored on the secondary base station (SCG split bearer), that the secondary base station controls a transmission rate between the secondary base station and the UE based on the second UE-AMBR includes:

over a downlink, based on the downlink second UE-AMBR, the secondary base station controls downlink transmission rates that are of the secondary cell group bearer and the split bearer anchored on the secondary base station and that are between the secondary base station and a UE, and controls a downlink transmission rate that is of the split bearer anchored on the secondary base station and that is between the master base station and the UE; or over an uplink, the secondary base station controls uplink transmission rates that are of the secondary cell group bearer and the split bearer anchored on the secondary base station and that are between the secondary base station and the UE based on the uplink second UE-AMBR.

According to the transmission rate control method provided in this embodiment of this application, the master base station obtains the UE-AMBR, determines the bearer type of the secondary base station, and determines, based on the UE-AMBR and the bearer type, the first UE-AMBR used for the master base station and the second UE-AMBR used for the secondary base station, and the master base station may send the second UE-AMBR and the bearer type to the secondary base station. The secondary base station may control the transmission rate between the secondary base station and the UE based on the second UE-AMBR and the bearer type, and the master base station controls the transmission rate between the master base station and the UE based on the first UE-AMBR.

All the control methods for controlling a UE-AMBR of UE that are described in the foregoing embodiments are also applicable to a GBR service. To be specific, the master base station may determine, based on a UE GBR, a first GBR used for the master base station and a second GBR used for the secondary base station. All manners are the same as those in the foregoing embodiments, and details are not described herein again.

Figure 7:
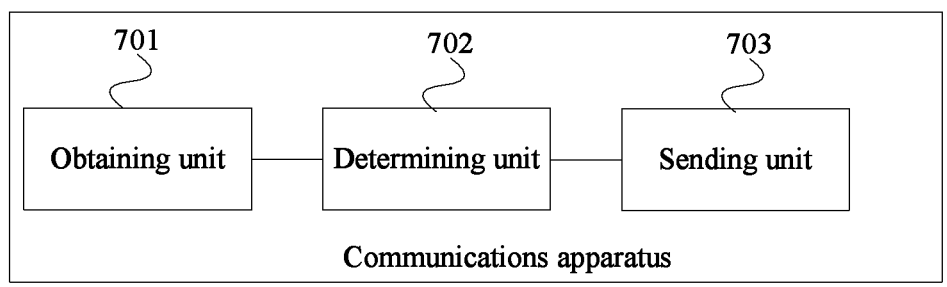
FIG. 7 is a schematic structural diagram of Embodiment 1 of a communications apparatus according to this application.

FIG. 7 is a schematic structural diagram of Embodiment 1 of a communications apparatus according to this application. The apparatus may be located in a base station. Referring to FIG. 7, the apparatus includes an obtaining unit 701, a determining unit 702, and a sending unit 703.

The obtaining unit 701 obtains a user equipment aggregate maximum bit rate UE-AMBR.

The determining unit 702 determines, based on the UE-AMBR, a first UE-AMBR used for the master base station and a second UE-AMBR used for a secondary base station.

The sending unit 703 sends the second UE-AMBR to the secondary base station.

The sending unit 703 further sends, to the secondary base station, instruction information used to instruct the secondary base station to control data splitting for the master base station.

Optionally, when only a split bearer anchored on the secondary base station (SCG split bearer) exists on the master base station, the instruction information is a third UE-AMBR, and the third UE-AMBR is equal to the first UE-AMBR.

Optionally, when only a split bearer anchored on the secondary base station (SCG split bearer) exists on the master base station, the instruction information is splitting control information.

Optionally, when both a split bearer anchored on the secondary base station (SCG split bearer) and a master cell group bearer (MCG bearer) exist on the master base station, the instruction information is a fourth UE-AMBR, and the fourth UE-AMBR is less than the first UE-AMBR.

When both a split bearer anchored on the secondary base station (SCG split bearer) and a master cell group bearer (MCG bearer) exist on the master base station, the instruction information is splitting control information.

Optionally, based on the embodiment shown in FIG. 7, the apparatus further includes a receiving unit, an adjustment unit, and a first control unit.

The receiving unit is configured to receive an adjusted second UE-AMBR from the secondary base station.

The adjustment unit is configured to adjust the first UE-AMBR based on the adjusted second UE-AMBR.

The first control unit is configured to adjust a transmission rate between the master base station and user equipment UE based on an adjusted first UE-AMBR.

Optionally, the apparatus further includes a second control unit.

When the master base station is configured to transmit uplink split data, the second control unit is configured to control an uplink transmission rate between the master base station and the UE based on the first UE-AMBR; and the second control unit is specifically configured to:

control an uplink transmission rate that is of the split bearer anchored on the secondary base station and that is between the master base station and the UE.

Optionally, the apparatus further includes a second control unit.

When the master base station is configured to transmit uplink split data, the second control unit is configured to control an uplink transmission rate between the master base station and the UE based on the first UE-AMBR; and the second control unit is specifically configured to:

control uplink transmission rates that are of the master cell group bearer and the split bearer anchored on the secondary base station and that are between the master base station and the UE.

Optionally, the apparatus further includes a second control unit.

The second control unit controls a downlink transmission rate between the master base station and the UE based on the first UE-AMBR; and the second control unit is specifically configured to:

control a downlink transmission rate that is of the split bearer anchored on the secondary base station and that is between the master base station and the UE.

Optionally, the apparatus further includes a second control unit.

The second control unit controls a downlink transmission rate between the master base station and the UE based on the first UE-AMBR; and the second control unit is specifically configured to:

control downlink transmission rates that are of the master cell group bearer and the split bearer anchored on the secondary base station and that are between the master base station and the UE.

The foregoing apparatus can be configured to perform the method provided in the foregoing corresponding method embodiment. A specific implementation and technical effects are similar to those of the method provided in the foregoing method embodiment, and details are not described herein again.

It should be noted that division of the foregoing units of the communications apparatus is merely division of logical functions. In actual implementation, all or some of the units may be integrated into one physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be an independently disposed processing element, or may be integrated into a chip of the base station for implementation. In addition, the sending unit may be alternatively stored in a memory of the base station in a form of a program, and a processing element of the base station invokes and executes a function of the sending unit. An implementation of another unit is similar to that of the sending unit. In addition, all or some of the units may be integrated together or may be implemented separately. The processing element herein may be an integrated circuit with a signal processing capability. In an implementation process, the steps of the foregoing method or the foregoing units may be implemented by using an integrated logic circuit of hardware in the processing element, or by using an instruction in a form of software. In addition, the sending unit is a sending control unit, and may receive, by using a sending apparatus such as an antenna or a radio frequency apparatus of the base station, information sent by a terminal.

The foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented by a processing element invoking a program, the processing element may be a general purpose processor, for example, a central processing unit (CPU) or another processor that can invoke the program. For another example, the units may be integrated and implemented in a form of a system-on-a-chip (SOC).

Figure 8:
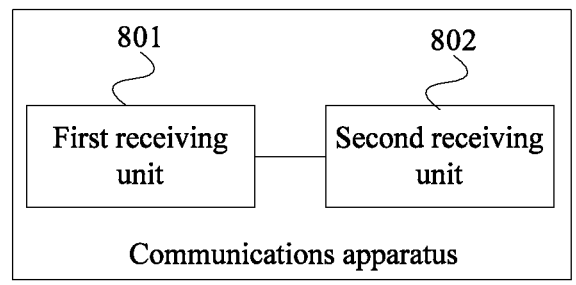
FIG. 8 is a schematic structural diagram of Embodiment 2 of a communications apparatus according to this application.

FIG. 8 is a schematic structural diagram of Embodiment 2 of a communications apparatus according to this application. The apparatus may be located in a base station. Referring to FIG. 8, the apparatus includes a first receiving unit 801 and a second receiving unit 802.

The first receiving unit 801 is configured to receive, from a master base station, a second user equipment aggregate maximum bit rate UE-AMBR used for the secondary base station, where the second UE-AMBR is obtained based on a UE-AMBR.

The second receiving unit 802 is configured to receive instruction information from the master base station, where the instruction information is used to instruct the secondary base station to control data splitting for the master base station.

Optionally, based on the embodiment shown in FIG. 8, the apparatus further includes a control unit.

When only a split bearer anchored on the secondary base station (SCG split bearer) exists on the master base station, the instruction information is a third UE-AMBR, the third UE-AMBR is equal to a first UE-AMBR used for the master base station, and the first UE-AMBR is obtained based on the UE-AMBR;

the control unit is configured to control a downlink transmission rate between the master base station and user equipment based on the third UE-AMBR; and the control unit is specifically configured to:

control a downlink transmission rate that is of the split bearer anchored on the secondary base station and that is between the master base station and the UE.

Optionally, based on the embodiment shown in FIG. 8, the apparatus further includes a first sending unit.

When only a split bearer anchored on the secondary base station (SCG split bearer) exists on the master base station, the instruction information is splitting control information; and the first sending unit is configured to send split data to the master base station according to the splitting control information.

Optionally, based on the embodiment shown in FIG. 8, the apparatus further includes a second sending unit.

When both a split bearer anchored on the secondary base station (SCG split bearer) and a master cell group bearer (MCG bearer) exist on the master base station, the instruction information is a fourth UE-AMBR, the fourth UE-AMBR is less than a first UE-AMBR used for the master base station, and the first UE-AMBR is obtained based on the UE-AMBR; and the second sending unit is configured to send split data to the master base station according to the fourth UE-AMBR.

Optionally, based on the embodiment shown in FIG. 8, the apparatus further includes a third sending unit.

When both a split bearer anchored on the secondary base station (SCG split bearer) and a master cell group bearer (MCG bearer) exist on the master base station, the instruction information is splitting control information; and the third sending unit is configured to send split data to the master base station according to the splitting control information.

Optionally, based on the embodiment shown in FIG. 8, the apparatus further includes a processing unit and a fourth sending unit.

The processing unit is configured to adjust the second UE-AMBR.

The fourth sending unit is configured to send an adjusted second UE-AMBR to the master base station.

The foregoing apparatus can be configured to perform the method provided in the foregoing corresponding method embodiment. A specific implementation and technical effects are similar to those of the method provided in the foregoing method embodiment, and details are not described herein again.

It should be noted that division of the foregoing units of the communications apparatus is merely division of logical functions. In actual implementation, all or some of the units may be integrated into one physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be an independently disposed processing element, or may be integrated into a chip of the base station for implementation. In addition, the sending unit may be alternatively stored in a memory of the base station in a form of a program, and a processing element of the base station invokes and executes a function of the sending unit. An implementation of another unit is similar to that of the sending unit. In addition, all or some of the units may be integrated together or may be implemented separately. The processing element herein may be an integrated circuit with a signal processing capability. In an implementation process, the steps of the foregoing method or the foregoing units may be implemented by using an integrated logic circuit of hardware in the processing element, or by using an instruction in a form of software. In addition, the sending unit is a sending control unit, and may receive, by using a sending apparatus such as an antenna or a radio frequency apparatus of the base station, information sent by a terminal.

The foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented by a processing element invoking a program, the processing element may be a general purpose processor, for example, a central processing unit (CPU) or another processor that can invoke the program. For another example, the units may be integrated and implemented in a form of a system-on-a-chip (SOC).

Figure 9:
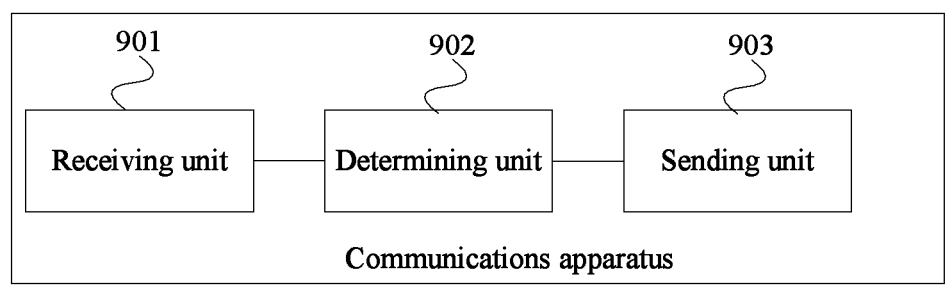
FIG. 9 is a schematic structural diagram of Embodiment 3 of a communications apparatus according to this application.

FIG. 9 is a schematic structural diagram of Embodiment 3 of a communications apparatus according to this application. The apparatus may be located in a base station. Referring to FIG. 9, the apparatus includes a receiving unit 901, a determining unit 902, and a sending unit 903.

The receiving unit 901 is configured to receive a user equipment aggregate maximum bit rate UE-AMBR from a master base station.

The determining unit 902 is configured to determine, based on the UE-AMBR, a first UE-AMBR used for the master base station and a second UE-AMBR used for the secondary base station.

The sending unit 903 is configured to send the first UE-AMBR and/or the second UE-AMBR to the master base station.

Optionally, the receiving unit 901 is further configured to receive reference information sent by the master base station. The reference information includes:

information about all non-guaranteed bit rate non-GBR services supported by user equipment UE; or information about a non-GBR service corresponding to a master cell group bearer.

The determining, by the secondary base station based on the UE-AMBR, a first UE-AMBR used for the secondary base station and a second UE-AMBR used for the master base station includes:

determining, by the secondary base station, the first UE-AMBR and the second UE-AMBR based on the reference information and the UE-AMBR.

Optionally, the information about the non-GBR service includes at least one of the following combinations:

a quantity of non-GBR services; or a quality of service class identifier QCI corresponding to the non-GBR service; or a radio access bearer identifier corresponding to the non-GBR service; or an allocation/retention priority ARP corresponding to the non-GBR service.

The foregoing apparatus can be configured to perform the method provided in the foregoing corresponding method embodiment. A specific implementation and technical effects are similar to those of the method provided in the foregoing method embodiment, and details are not described herein again.

It should be noted that division of the foregoing units of the communications apparatus is merely division of logical functions. In actual implementation, all or some of the units may be integrated into one physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be an independently disposed processing element, or may be integrated into a chip of the base station for implementation. In addition, the sending unit may be alternatively stored in a memory of the base station in a form of a program, and a processing element of the base station invokes and executes a function of the sending unit. An implementation of another unit is similar to that of the sending unit. In addition, all or some of the units may be integrated together or may be implemented separately. The processing element herein may be an integrated circuit with a signal processing capability. In an implementation process, the steps of the foregoing method or the foregoing units may be implemented by using an integrated logic circuit of hardware in the processing element, or by using an instruction in a form of software. In addition, the sending unit is a sending control unit, and may receive, by using a sending apparatus such as an antenna or a radio frequency apparatus of the base station, information sent by a terminal.

The foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented by a processing element invoking a program, the processing element may be a general purpose processor, for example, a central processing unit (CPU) or another processor that can invoke the program. For another example, the units may be integrated and implemented in a form of a system-on-a-chip (SOC).

Figure 10:
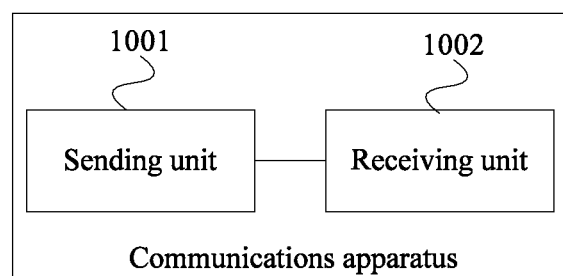
FIG. 10 is a schematic structural diagram of Embodiment 4 of a communications apparatus according to this application.

FIG. 10 is a schematic structural diagram of Embodiment 4 of a communications apparatus according to this application. The apparatus may be located in a base station. Referring to FIG. 10, the apparatus includes a sending unit 1001 and a receiving unit 1002.

The sending unit 1001 is configured to send a user equipment aggregate maximum bit rate UE-AMBR to a secondary base station.

The receiving unit 1002 is configured to receive a first UE-AMBR and/or a second UE-AMBR from the secondary base station, where the first UE-AMBR and the second UE-AMBR are obtained based on the UE-AMBR.

Optionally, the sending unit 1001 is further configured to:
send reference information to the secondary base station. The reference information includes:
information about all non-guaranteed bit rate non-GBR services supported by user equipment UE; or
information about a non-GBR service corresponding to a master cell group bearer.

Optionally, the information about the non-GBR service includes at least one of the following combinations:
a quantity of non-GBR services; or
a quality of service class identifier QCI corresponding to the non-GBR service; or
a radio access bearer identifier corresponding to the non-GBR service; or
an allocation/retention priority ARP corresponding to the non-GBR service.

The foregoing apparatus can be configured to perform the method provided in the foregoing corresponding method embodiment. A specific implementation and technical effects are similar to those of the method provided in the foregoing method embodiment, and details are not described herein again.

It should be noted that division of the foregoing units of the communications apparatus is merely division of logical functions. In actual implementation, all or some of the units may be integrated into one physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be an independently disposed processing element, or may be integrated into a chip of the base station for implementation. In addition, the sending unit may be alternatively stored in a memory of the base station in a form of a program, and a processing element of the base station invokes and executes a function of the sending unit. An implementation of another unit is similar to that of the sending unit. In addition, all or some of the units may be integrated together or may be implemented separately. The processing element herein may be an integrated circuit with a signal processing capability. In an implementation process, the steps of the foregoing method or the foregoing units may be implemented by using an integrated logic circuit of hardware in the processing element, or by using an instruction in a form of software. In addition, the sending unit is a sending control unit, and may receive, by using a sending apparatus such as an antenna or a radio frequency apparatus of the base station, information sent by a terminal.

The foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented by a processing element invoking a program, the processing element may be a general purpose processor, for example, a central processing unit (CPU) or another processor that can invoke the program. For another example, the units may be integrated and implemented in a form of a system-on-a-chip (SOC).

Figure 11:
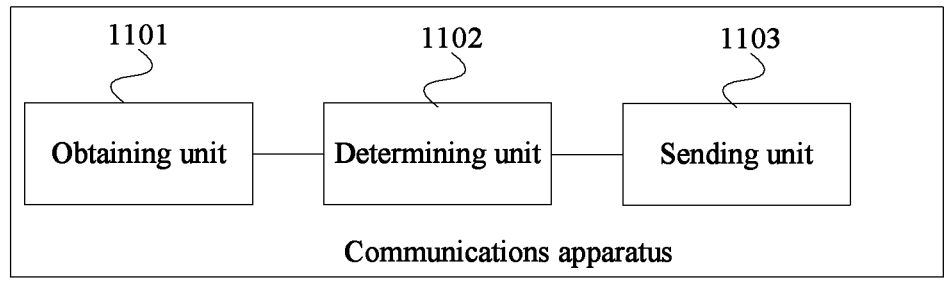
FIG. 11 is a schematic structural diagram of Embodiment 5 of a communications apparatus according to this application.

FIG. 11 is a schematic structural diagram of Embodiment 5 of a communications apparatus according to this application. The apparatus may be located in a base station. Referring to FIG. 11, the apparatus includes an obtaining unit 1101, a determining unit 1102, and a sending unit 1103.

The obtaining unit 1101 obtains a user equipment aggregate maximum bit rate UE-AMBR.

The determining unit 1102 determines a bearer type of a secondary base station, and determines, based on the UE-AMBR, a second UE-AMBR used for the secondary base station, where the second UE-AMBR is used by the secondary base station to control a terminal transmission rate based on the bearer type of the secondary base station.

The sending unit 1103 sends the second UE-AMBR and the bearer type of the secondary base station to the secondary base station.

Optionally, when the bearer type of the secondary base station includes only a secondary cell group bearer (SCG bearer), that the second UE-AMBR is used by the secondary base station to control a terminal transmission rate based on the bearer type of the secondary base station includes:
the secondary base station controls a transmission rate between the secondary base station and a UE based on the second UE-AMBR.

Optionally, when the bearer type of the secondary base station includes only a split bearer anchored on the secondary base station, that the second UE-AMBR is used by the secondary base station to control a terminal transmission rate based on the bearer type of the secondary base station includes:

over a downlink, based on the second UE-AMBR, the secondary base station controls a downlink transmission rate that is of the split bearer anchored on the secondary base station and that is between the secondary base station and the UE, and controls a downlink transmission rate that is of the split bearer anchored on the secondary base station and that is between the master base station and the UE; or over an uplink, the secondary base station controls an uplink transmission rate that is of the split bearer anchored on the secondary base station and that is between the secondary base station and the UE based on the second UE-AMBR.

Optionally, when the bearer type of the secondary base station includes a secondary cell group bearer and a split bearer anchored on the secondary base station, that the second UE-AMBR is used by the secondary base station to control a terminal transmission rate based on the bearer type of the secondary base station includes:

over a downlink, based on the second UE-AMBR, the secondary base station controls downlink transmission rates that are of the secondary cell group bearer and the split bearer anchored on the secondary base station and that are between the secondary base station and a UE, and controls a downlink transmission rate that is of the split bearer anchored on the secondary base station and that is between the master base station and the UE; or over an uplink, the secondary base station controls uplink transmission rates that are of the secondary cell group bearer and the split bearer anchored on the secondary base station and that are between the secondary base station and the UE.

The foregoing apparatus can be configured to perform the method provided in the foregoing corresponding method embodiment. A specific implementation and technical effects are similar to those of the method provided in the foregoing method embodiment, and details are not described herein again.

It should be noted that division of the foregoing units of the communications apparatus is merely division of logical functions. In actual implementation, all or some of the units may be integrated into one physical entity, or may be physically separated. In addition, all of the units may be implemented in a form of software invoked by a processing element or in a form of hardware. Alternatively, some of the units may be implemented in a form of software invoked by a processing element, and some of the units may be implemented in a form of hardware. For example, the sending unit may be an independently disposed processing element, or may be integrated into a chip of the base station for implementation. In addition, the sending unit may be alternatively stored in a memory of the base station in a form of a program, and a processing element of the base station invokes and executes a function of the sending unit. An implementation of another unit is similar to that of the sending unit. In addition, all or some of the units may be integrated together or may be implemented separately. The processing element herein may be an integrated circuit with a signal processing capability. In an implementation process, the steps of the foregoing method or the foregoing units may be implemented by using an integrated logic circuit of hardware in the processing element, or by using an instruction in a form of software. In addition, the sending unit is a sending control unit, and may receive, by using a sending apparatus such as an antenna or a radio frequency apparatus of the base station, information sent by a terminal.

The foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented by a processing element invoking a program, the processing element may be a general purpose processor, for example, a central processing unit (CPU) or another processor that can invoke the program. For another example, the units may be integrated and implemented in a form of a system-on-a-chip (SOC).

Figure 12:
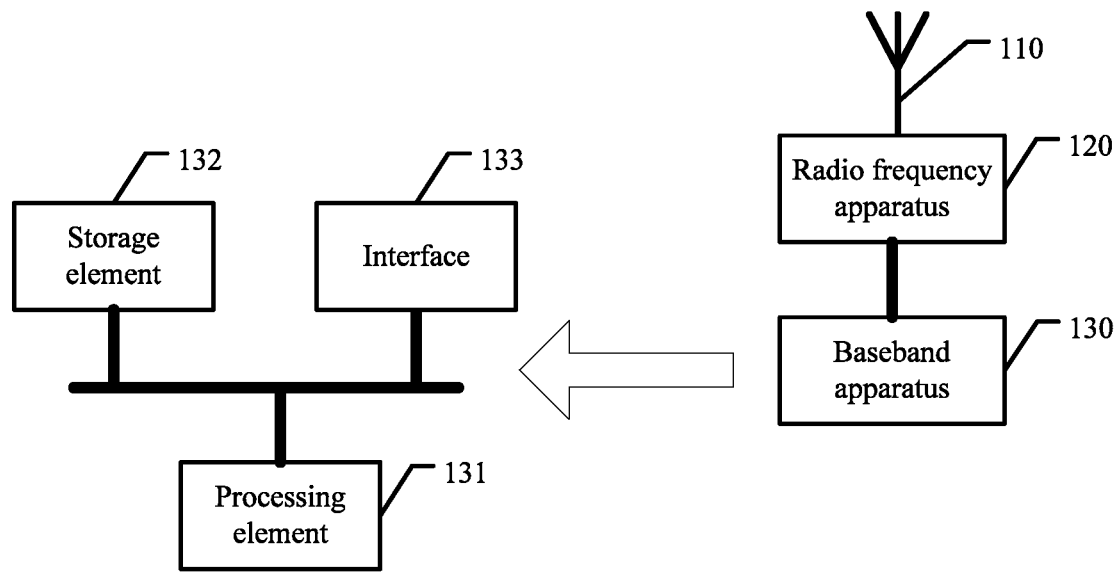
FIG. 12 is a schematic structural diagram of a base station according to an embodiment of this application.

FIG. 12 is a schematic structural diagram of a base station according to an embodiment of this application. Referring to in FIG. 12, the base station includes an antenna 110, a radio frequency apparatus 120, and a baseband apparatus 130. The antenna 110 is connected to the radio frequency apparatus 120. In an uplink direction, the radio frequency apparatus 120 receives, through the antenna 110, information sent by a terminal, and sends, to the baseband apparatus 130 for processing, the information sent by the terminal. In a downlink direction, the baseband apparatus 130 processes the information from the terminal, and sends the processed information to the radio frequency apparatus 120, and the radio frequency apparatus 120 processes the information from the terminal, and then sends the processed information to the terminal through the antenna 110.

The foregoing communications apparatus may be located in the baseband apparatus 130. In an implementation, the foregoing units are implemented by a processing element invoking a program. For example, the baseband apparatus 130 includes a processing element 131 and a storage element 132. The processing element 131 invokes a program stored in the storage element 132, to perform the method in the foregoing method embodiment. In addition, the baseband apparatus 130 may further include an interface 133, configured to exchange information with the radio frequency apparatus 120. For example, the interface is a common public radio interface (CPRI).

In another implementation, these units may be one or more processing elements configured to implement the foregoing method, and these processing elements are disposed on the baseband apparatus 130. The processing element herein may be an integrated circuit, for example, one or more ASICs, one or more DSPs, or one or more FPGAs. These integrated circuits may be integrated together to form a chip.

For example, the foregoing units may be integrated and implemented in a form of a system-on-a-chip (SOC). For example, the baseband apparatus 130 includes an SOC chip, and the SOC chip is configured to implement the foregoing method. A processing element 131 and a storage element 132 may be integrated into the chip, and the processing element 131 invokes a program stored in the storage element 132, to implement the foregoing method or functions of the foregoing units. Alternatively, at least one integrated circuit may be integrated into the chip, to implement the foregoing method or functions of the foregoing units. Alternatively, the foregoing implementations may be combined, so that functions of some units are implemented by a processing element invoking a program, and functions of some units are implemented by an integrated circuit.

In any manner, the communications apparatus includes at least one processing element, a storage element, and a communications interface. The at least one processing element is configured to perform the method provided in the foregoing method embodiment. The processing element may perform some or all of the steps in the foregoing method embodiment in a first manner, namely, a manner of executing a program stored in the storage element, or in a second manner, namely, a manner of using an integrated logic circuit of hardware in the processing element in combination with an instruction. Certainly, the method provided in the foregoing method embodiment may be alternatively performed by combining the first manner with the second manner.

Similar to the foregoing description, the processing element herein may be a general purpose processor such as a central processing unit (CPU), or may be one or more integrated circuits configured to implement the foregoing method, for example, one or more application-specific integrated circuits (ASIC), one or more microprocessors (digital signal processor, DSP), or one or more field programmable gate arrays (FPGA).

The storage element may be a memory, or may be a general term of a plurality of storage elements.

This application further provides a storage medium, including a readable storage medium and a computer program. The computer program is used to implement the transmission rate control method provided in any one of the foregoing embodiments.

This application further provides a program product, the program product includes a computer program (namely, an execution instruction), and the computer program is stored in a readable storage medium. At least one processor of a sending device may read the computer program from the readable storage medium, and the at least one processor executes the computer program, so that the sending device implements the transmission rate control method provided in the foregoing implementations.

An embodiment of this application further provides a communications apparatus, including at least one storage element and at least one processing element. The at least one storage element is configured to store a program. When the program is executed, the communications apparatus is enabled to perform the operation of the base station (the master base station or the secondary base station) in any one of the foregoing embodiments. The apparatus may be a base station chip.

All or some of the steps in the foregoing method embodiments may be implemented by a program instructing related hardware. The foregoing program may be stored in a readable memory. When the program is executed, the steps in the method embodiments are performed. The foregoing memory (storage medium) includes a read-only memory (ROM for short), a RAM, a flash memory, a hard disk, a solid state disk, a magnetic tape, a floppy disk, an optical disc, or any combination thereof.

The invention claimed is:

1. A transmission rate control method, comprising:
   receiving, by a secondary base station, a second user equipment (UE) aggregate maximum bit rate (UE-AMBR) and a bearer type of the secondary base station from a master base station, wherein the second UE-AMBR is determined according to a UE-AMBR received from a core-network; and
   controlling, by the secondary base station, a terminal transmission rate based on the second UE-AMBR and the bearer type of the secondary base station; and wherein:
      when the bearer type of the secondary base station comprises only a split bearer anchored on the secondary base station, the controlling, by secondary base station, a terminal transmission rate based on the second UE-AMBR and the bearer type of the secondary base station comprises controlling, over an uplink by the secondary base station, an uplink transmission rate that is of the split bearer anchored on the secondary base station and that is between the secondary base station and the UE based on the second UE-AMBR; and
      when the bearer type of the secondary base station comprises a secondary cell group bearer and a split bearer anchored on the secondary base station, the controlling, by the secondary base station, a terminal transmission rate based on the second UE-AMBR and the bearer type of the secondary base station comprises controlling, over an uplink by the secondary base station, uplink transmission rates that are of the secondary cell group bearer and the split bearer anchored on the secondary base station and that are between the secondary base station and the UE based on the second UE-AMBR.

2. The method according to claim 1, wherein when the bearer type of the secondary base station comprises only a secondary cell group bearer, the controlling, by the secondary base station, a terminal transmission rate based on the second UE-AMBR and the bearer type of the secondary base station comprises:
   controlling, by the secondary base station, a transmission rate between the secondary base station and a UE based on the second UE-AMBR.

3. The method according to claim 1, wherein when the bearer type of the secondary base station comprises only a split bearer anchored on the secondary base station, the controlling, by the secondary base station, a terminal transmission rate based on the second UE-AMBR and the bearer type of the secondary base station comprises:
   over a downlink, based on the second UE-AMBR, controlling, by the secondary base station, a downlink transmission rate that is of the split bearer anchored on the secondary base station and that is between the secondary base station and a UE; and
   controlling, by the secondary base station, a downlink transmission rate that is of the split bearer anchored on the secondary base station and that is between the master base station and the UE.

4. The method according to claim 1, wherein when the bearer type of the secondary base station comprises a secondary cell group bearer and a split bearer anchored on the secondary base station, the controlling, by the secondary base station, a terminal transmission rate based on the second UE-AMBR and the bearer type of the secondary base station comprises:
   over a downlink, based on the second UE-AMBR, controlling, by the secondary base station, downlink transmission rates that are of the secondary cell group bearer and the split bearer anchored on the secondary base station and that are between the secondary base station and a UE; and
   controlling a downlink transmission rate that is of the split bearer anchored on the secondary base station and that is between the master base station and the UE.

5. A transmission rate control method, comprising:
   obtaining, by a master base station, a user equipment (UE) aggregate maximum bit rate (UE-AMBR);
   determining, by the master base station, a bearer type of a secondary base station;
   determining, based on the UE-AMBR, a second UE-AMBR used for the secondary base station, wherein the second UE-AMBR is used by the secondary base station to control a terminal transmission rate based on the bearer type of the secondary base station; and sending, by the master base station, the second UE-AMBR and the bearer type of the secondary base station to the secondary base station, wherein:

when the bearer type of the secondary base station comprises only a split bearer anchored on the secondary base station, the second UE-AMBR is used by the secondary base station to control a terminal transmission rate based on the bearer type of the secondary base station comprises over an uplink, the second UE-AMBR is used by the secondary base station to control an uplink transmission rate that is of the split bearer anchored on the secondary base station and that is between the secondary base station and the UE; and when the bearer type of the secondary base station comprises only a split bearer anchored on the secondary base station, the second UE-AMBR is used by the secondary base station to control a terminal transmission rate based on the bearer type of the secondary base station comprises over an uplink, the second UE-AMBR is used by the secondary base station to control an uplink transmission rate that is of the split bearer anchored on the secondary base station and that is between the secondary base station and the UE.

6. The method according to claim 5, wherein when the bearer type of the secondary base station comprises only a secondary cell group bearer, the second UE-AMBR is used by the secondary base station to control a terminal transmission rate based on the bearer type of the secondary base station comprises:

the second UE-AMBR is used by the secondary base station to control a transmission rate between the secondary base station and a UE.

7. The method according to claim 5, wherein when the bearer type of the secondary base station comprises only a split bearer anchored on the secondary base station, the second UE-AMBR is used by the secondary base station to control a terminal transmission rate based on the bearer type of the secondary base station comprises:

over a downlink, the second UE-AMBR is used by the secondary base station to control a downlink transmission rate that is of the split bearer anchored on the secondary base station and that is between the secondary base station and a UE; and the second UE-AMBR is used by the secondary base station to control a downlink transmission rate that is of the split bearer anchored on the secondary base station and that is between the master base station and the UE.

8. The method according to claim 5, wherein when the bearer type of the secondary base station comprises a secondary cell group bearer and a split bearer anchored on the secondary base station, the second UE-AMBR is used by the secondary base station to control a terminal transmission rate based on the bearer type of the secondary base station comprises:

over a downlink, the second UE-AMBR is used by the secondary base station to control downlink transmission rates that are of the secondary cell group bearer and the split bearer anchored on the secondary base station and that are between the secondary base station and a UE; and the second UE-AMBR is used by the secondary base station to control a downlink transmission rate that is of the split bearer anchored on the secondary base station and that is between the master base station and the UE.

9. A communications apparatus, comprising:

at least one processor; and a memory, wherein the memory is configured to store instructions executable by the at least one processor, wherein the instructions, when executed by the at least one processor, instruct a secondary base station to perform the following operations:

receiving a second user equipment (UE) aggregate maximum bit rate (UE-AMBR) and a bearer type of the secondary base station from a master base station, wherein the second UE-AMBR is determined according to a UE-AMBR received from a core-network; and controlling a terminal transmission rate based on the second UE-AMBR and the bearer type of the secondary base station, and wherein:

when the bearer type of the secondary base station comprises only a split bearer anchored on the secondary base station, the controlling, by the secondary base station, a terminal transmission rate based on the second UE-AMBR and the bearer type of the secondary base station comprises controlling, over an uplink, an uplink transmission rate that is of the split bearer anchored on the secondary base station and that is between the secondary base station and the UE based on the second UE-AMBR; and when the bearer type of the secondary base station comprises a secondary cell group bearer and a split bearer anchored on the secondary base station, the controlling, by the secondary base station, a terminal transmission rate based on the second UE-AMBR and the bearer type of the secondary base station comprises controlling, over an uplink, uplink transmission rates that are of the secondary cell group bearer and the split bearer anchored on the secondary base station and that are between the secondary base station and the UE based on the second UE-AMBR.

10. The apparatus according to claim 9, wherein when the bearer type of the secondary base station comprises only a secondary cell group bearer, the controlling a terminal transmission rate based on the second UE-AMBR and the bearer type of the secondary base station comprises:

controlling a transmission rate between the secondary base station and a UE based on the second UE-AMBR.

11. The apparatus according to claim 9, wherein when the bearer type of the secondary base station comprises only a split bearer anchored on the secondary base station, the controlling a terminal transmission rate based on the second UE-AMBR and the bearer type of the secondary base station comprises:

controlling a downlink transmission rate that is of the split bearer anchored on the secondary base station and that is between the secondary base station and a UE; and controlling, by the secondary base station, a downlink transmission rate that is of the split bearer anchored on the secondary base station and that is between the master base station and the UE.

12. The apparatus according to claim 9, wherein when the bearer type of the secondary base station comprises a secondary cell group bearer and a split bearer anchored on the secondary base station, the controlling, by the secondary base station, a terminal transmission rate based on the second UE-AMBR and the bearer type of the secondary base station comprises:
- over a downlink, based on the second UE-AMBR, controlling downlink transmission rates that are of the secondary cell group bearer and the split bearer anchored on the secondary base station and that are between the secondary base station and a UE; and
- controlling a downlink transmission rate that is of the split bearer anchored on the secondary base station and that is between the master base station and the UE.

13. A communication apparatus, comprising:
- at least one processor; and
- a memory, wherein the memory is configured to store instructions executable by the at least one processor, wherein the instructions, when executed by the at least one processor, instruct a secondary base station to perform the following operations:
  - obtaining a user equipment (UE) aggregate maximum bit rate (UE-AMBR);
  - determining a bearer type of a secondary base station;
  - determining, based on the UE-AMBR, a second UE-AMBR used for the secondary base station, wherein the second UE-AMBR is used by the secondary base station to control a terminal transmission rate based on the bearer type of the secondary base station; and
  - sending the second UE-AMBR and the bearer type of the secondary base station to the secondary base station, wherein:
    - when the bearer type of the secondary base station comprises only a split bearer anchored on the secondary base station, the second UE-AMBR is used by the secondary base station to control a terminal transmission rate based on the bearer type of the secondary base station comprises over an uplink, the second UE-AMBR is used by the secondary base station to control an uplink transmission rate that is of the split bearer anchored on the secondary base station and that is between the secondary base station and the UE; and
    - when the bearer type of the secondary base station comprises only a split bearer anchored on the secondary base station, the second UE-AMBR is used by the secondary base station to control a terminal transmission rate based on the bearer type of the secondary base station comprises over an uplink, the second UE-AMBR is used by the secondary base station to control an uplink transmission rate that is of the split bearer anchored on the secondary base station and that is between the secondary base station and the UE.

* * * * *